(12) United States Patent
Xie

(10) Patent No.: US 12,236,155 B2
(45) Date of Patent: Feb. 25, 2025

(54) METHOD AND COMMUNICATION SYSTEM FOR CONTROLLING PLURALITY OF SCREEN DEVICES

(71) Applicant: HUAWEI TECHNOLOGIES CO., LTD., Guangdong (CN)

(72) Inventor: Zhiqiang Xie, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/274,811

(22) PCT Filed: Jan. 18, 2022

(86) PCT No.: PCT/CN2022/072603
§ 371 (c)(1),
(2) Date: Jul. 28, 2023

(87) PCT Pub. No.: WO2022/161220
PCT Pub. Date: Aug. 4, 2022

(65) Prior Publication Data
US 2024/0118854 A1    Apr. 11, 2024

(30) Foreign Application Priority Data
Jan. 30, 2021 (CN) .......................... 202110131980.9

(51) Int. Cl.
*G06F 3/14* (2006.01)

(52) U.S. Cl.
CPC .................................. *G06F 3/1446* (2013.01)

(58) Field of Classification Search
None
See application file for complete search history.

(56) References Cited

U.S. PATENT DOCUMENTS

| 2014/0313103 | A1 | 10/2014 | Goel et al. | |
|---|---|---|---|---|
| 2018/0129462 | A1* | 5/2018 | Han | H04N 5/445 |
| 2019/0251884 | A1* | 8/2019 | Burns | G09G 5/14 |

FOREIGN PATENT DOCUMENTS

| CN | 101127155 A | 2/2008 |
|---|---|---|
| CN | 103699211 A | 4/2014 |
| CN | 109803126 A | 5/2019 |

\* cited by examiner

*Primary Examiner* — Carl Adams
(74) *Attorney, Agent, or Firm* — WOMBLE BOND DICKINSON (US) LLP

(57) ABSTRACT

The communication system includes a first screen device, a second screen device, a first Bluetooth device connected to the first screen device through Bluetooth, and a second Bluetooth device connected to the second screen device through Bluetooth. The method includes: The first screen device and the second screen device form a first screen group, and determine that the first screen device is a primary control device of the first screen group. The first screen device sends first instruction information to the second screen device. The first instruction information is used to instruct the second Bluetooth device to be communicatively connected to the first screen device.

20 Claims, 25 Drawing Sheets

Screen device 200

Remote control device 100

Screen device 200

Remote control
device 100

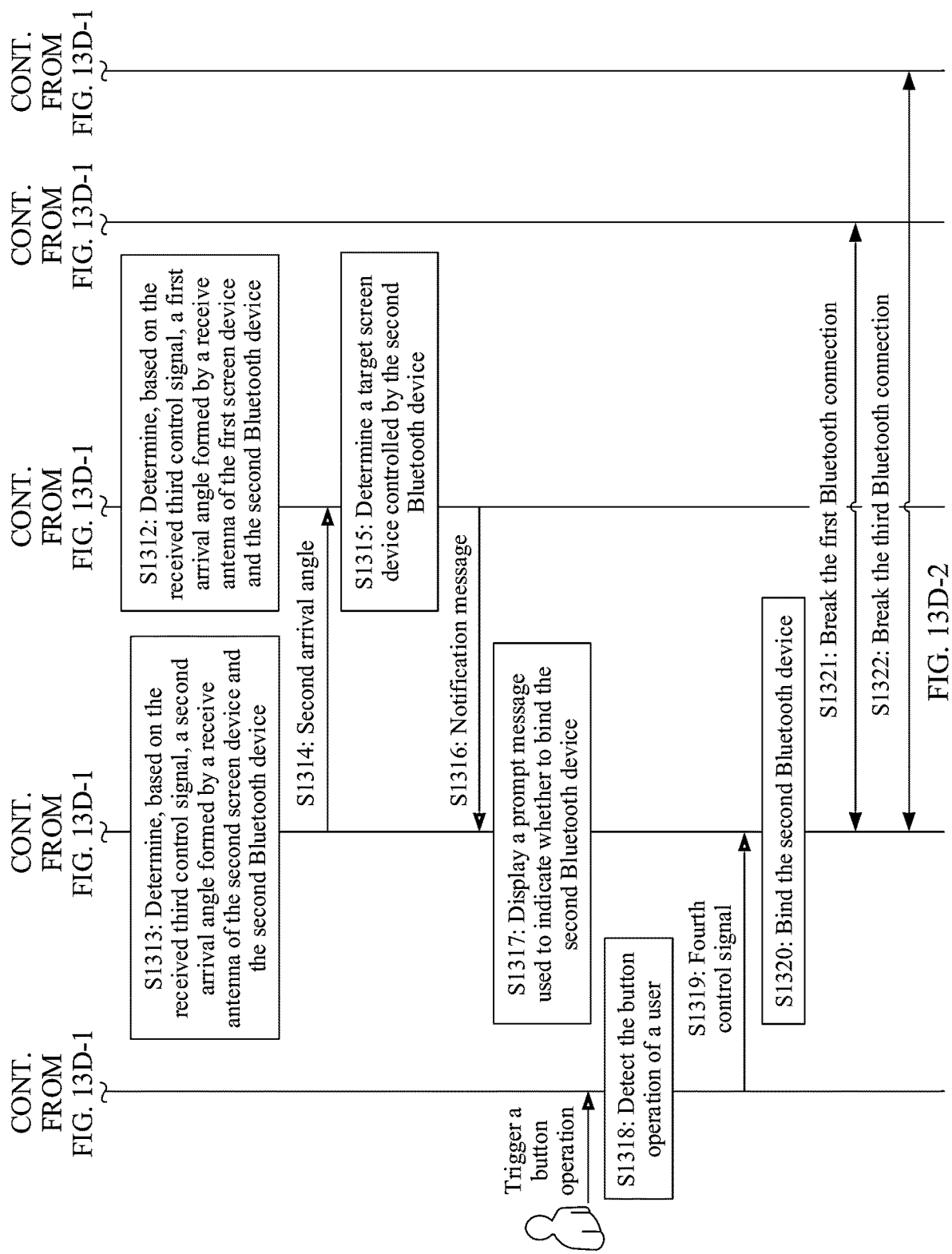

METHOD AND COMMUNICATION SYSTEM FOR CONTROLLING PLURALITY OF SCREEN DEVICES

CROSS-REFERENCE TO RELATED APPLICATIONS

This application is a national stage of International Application No. PCT/CN2022/072603, filed on Jan. 18, 2022, which claims priority to Chinese Patent Application No. 202110131980.9 filed on Jan. 30, 2021. Both of the aforementioned applications are hereby incorporated by reference in their entireties.

TECHNICAL FIELD

This application relates to the field of communication technologies, and in particular, to a method and a communication system for controlling a plurality of screen devices.

BACKGROUND

There may be a plurality of screen devices at home. Each screen device is equipped with a Bluetooth remote control. Generally, a user operates the Bluetooth remote control paired with the screen device, to control the screen device. Such a pairing technology in which the screen device and the Bluetooth remote control are bound in a one-to-one manner cannot meet all screen control scenarios. For example, the user splices screens of the plurality of screen devices into one large combined screen.

In the conventional technologies, an additional hardware device or module is usually separately configured for the combined screen, to receive and process a control signal from each Bluetooth remote control, thereby completing control on the combined screen. However, this manner is not applicable to a scenario in which there are only a screen device and a Bluetooth remote control matching the screen device at home. In addition, hardware complexity and the costs are increased due to configuration of the additional hardware device or module.

SUMMARY

Embodiments of this application provide a method and a communication system for controlling a plurality of screen devices, so that a user controls a plurality of screen devices without adding a hardware device or module.

According to a first aspect, an embodiment of this application provides a method for controlling a plurality of screen devices. The method is applied to a communication system. The communication system includes a first screen device, a second screen device, a first Bluetooth device connected to the first screen device through Bluetooth, and a second Bluetooth device connected to the second screen device through Bluetooth. The method includes: The first screen device and the second screen device form a first screen group, and determine that the first screen device is a primary control device of the first screen group. The first screen device sends first instruction information to the second screen device. The first instruction information is used to instruct the second Bluetooth device to be communicatively connected to the first screen device.

In the foregoing method, the primary control screen in the screen group may establish a connection to each Bluetooth device corresponding to the screen group, and the primary control device may be controlled by using any Bluetooth device, to control a plurality of screen devices in the screen group.

In an embodiment, the first instruction information is further used to instruct the second screen device to share a received control signal with the first screen device. In this way, when a pairing relationship between a screen device and a Bluetooth device is not changed, after receiving a control signal, an auxiliary device may forward the control signal to the primary control device, so that the primary control device controls the auxiliary device.

In an embodiment, the first instruction information is used to instruct the second Bluetooth device to establish a Bluetooth connection to the first screen device. After the first screen device sends the first instruction information to the second screen device, the method includes: The first screen device establishes the Bluetooth connection to the second Bluetooth device. In this way, the primary control screen can be controlled by using any Bluetooth device corresponding to the screen group, and a user can randomly pick up a Bluetooth device to control the primary control screen, thereby controlling the screen group.

In an embodiment, the first instruction information is further used to instruct the second Bluetooth device to break a Bluetooth connection to the second screen device. After the first screen device sends the first instruction information to the second screen device, the method further includes: The second screen device releases the Bluetooth connection to the second Bluetooth device based on the first instruction information.

In an embodiment, that the first screen device and the second screen device form the first screen group includes: The first screen device detects a first screen combination operation. The first screen device forms the first screen group with the second screen device in response to the first screen combination operation.

In an embodiment, the first screen combination operation is an operation that is triggered by the user to physically splice the first screen device and the second screen device into a combined screen.

In an embodiment, before the first screen device forms the first screen group with the second screen device in response to the first screen combination operation, the method further includes: The first screen device displays first prompt information. The first prompt information indicates whether the first screen device forms a screen group with the second screen device. The first Bluetooth device sends a first control signal to the first screen device. The first control signal is used to indicate the first screen device to form the screen group with the second screen device.

In an embodiment, before the first screen device and the second screen device form the first screen group, the method further includes: The first screen device and the second screen device discover each other, establish a network connection, and form a screen cluster. A screen device in the screen cluster shares device information and pairing information of the screen device and a Bluetooth device paired with the screen device. In this way, device information can be shared in the screen cluster.

In an embodiment, that the first screen device and the second screen device determine that the first screen device is the primary control device in the first screen group includes that the first screen device and the second screen device determine, through negotiation, that the first screen device is a screen device with an optimal resource, and determine that the first screen device is a primary control device of the first screen group. The screen device with the optimal resource is determined based on performance of the screen device and a primary control identifier. In this way, the primary control device may be determined under more proper consideration of a resource condition of each screen device in the screen group.

In an embodiment, after the first screen device establishes the Bluetooth connection to the second Bluetooth device, the method further includes: The first screen device receives a first control signal sent by a target Bluetooth device. The target Bluetooth device is the first Bluetooth device or the second Bluetooth device. The first control signal is used to operate to-be-displayed content of the first screen group. The first screen device divides the to-be-displayed content into a first part and a second part based on the first control signal. The first screen device sends a first control instruction to the second screen device. The first control instruction is used to instruct the second screen device to display the second part of the to-be-displayed content. The first screen device displays the first part. The second screen device displays the second part. In this way, each screen device in the screen group can be controlled by using any Bluetooth device corresponding to the screen group.

In an embodiment, after the first screen device establishes the Bluetooth connection to the second Bluetooth device, the method further includes:

The first screen device receives a second control signal sent by a target Bluetooth device. The target Bluetooth device is the first Bluetooth device or second Bluetooth device. The second control signal is used to perform a control operation on each screen device in the first screen group. The first screen device sends a second control instruction corresponding to the second control signal to the second screen device. The second control instruction is used to instruct the second screen device to perform the control operation. The first screen device performs the control operation. The second screen device performs the control operation according to the second control instruction. In this way, each screen device in the screen group can be controlled by using any Bluetooth device corresponding to the screen group.

In an embodiment, the communication system further includes a third screen device in the screen cluster and a third Bluetooth device connected to the third screen device through Bluetooth, and the method further includes: The first screen group obtains second instruction information. The second instruction information is used to instruct to add the third screen device to the first screen group. The first screen device detects a second screen combination operation. The first screen device forms a second screen group with the second screen device and the third screen device in response to the second screen combination operation. The first screen device determines a primary control device of the second screen group with the second screen device and the third screen device. If the first screen device is the primary control device in the second screen group, the first screen device sends the second instruction information to the third screen device. The second instruction information is used to instruct the third screen device to break the Bluetooth connection to the third Bluetooth device. The third screen device releases the Bluetooth connection to the third Bluetooth device based on the second instruction information. The first screen device establishes a Bluetooth connection to the third Bluetooth device. In this way, after a screen device is newly added to the screen group, the primary control device is determined again, so that the new screen group is properly controlled by using the primary control device.

In an embodiment, the first screen group receives fourth instruction information. The fourth instruction information is used to instruct to remove a target screen device from the first screen group. The target screen device is the first screen device or the second screen device. The target screen device receives a third control signal from the target Bluetooth device. The target Bluetooth device is the first Bluetooth device or the second Bluetooth device. If the target screen device is the first screen device, the first screen device is bound to the target Bluetooth device based on the third control signal, and breaks a connection to another Bluetooth device other than the target Bluetooth device. Alternatively, if the target screen device is the second screen device, the first screen device sends fifth instruction information to the second screen device. The fifth instruction information is used to instruct the second screen device to be bound to the target Bluetooth device. The second screen device establishes a connection to the target Bluetooth device. The first screen device breaks a connection to the target Bluetooth device.

According to some embodiments, if a to-be-removed screen is the primary control device, that is, the first screen device, when the user operates any one of all the Bluetooth devices corresponding to the first screen group, the primary control device may be directly bound to the Bluetooth device currently operated by the user. If a to-be-removed screen is the auxiliary device, that is, the second screen device, when the user operates any one of all the Bluetooth devices corresponding to the first screen group, the auxiliary screen may be instructed by the primary control device to be directly bound to the Bluetooth device currently operated by the user. In this way, the user does not need to distinguish each Bluetooth device, and can randomly pick up a Bluetooth device to control the to-be-removed screen device.

In an embodiment, the communication system includes at least three screen devices, and the at least three screen devices form the first screen group. The method further includes:

The first screen group receives sixth instruction information. The sixth instruction information is used to instruct to remove any two screen devices from first screen group.

For one target screen device of the two to-be-removed screen devices,
   the target screen device establishes a connection to each Bluetooth device corresponding to the first screen group.

The target screen device receives a fourth control signal from the target Bluetooth device. The target Bluetooth device is any one of all the Bluetooth devices corresponding to the first screen group.

The target screen device determines, based on the fourth control signal, an arrival angle formed by a receive antenna of the target screen device and the target Bluetooth device, and a distance between the target screen device and the target Bluetooth device.

The two to-be-removed screen devices determine, based on a first arrival angle and a second arrival angle respectively corresponding to the two screen devices and/or a first distance and a second distance respectively corresponding to the two screen devices, a screen device controlled by using the target Bluetooth device.

According to some embodiments, in a scenario in which a plurality of screen devices are removed from the first screen group, a specific removed screen device controlled by using a currently operated Bluetooth device may be determined through determining an arrival angle and/or a distance. Therefore, the user does not need to distinguish each Bluetooth device, and can randomly pick up a Bluetooth device to accurately control the removed screen device. This operation process is simple and convenient.

In an embodiment, after the first screen group receives the fourth instruction information, the method further includes:

The first screen device displays first prompt information. The second screen device displays second prompt information. The first prompt information is used to prompt a first button operation for binding the first screen device. The second prompt information is used to prompt a second button operation for binding the second screen device.

The first screen device receives a fourth control signal from the target Bluetooth device. The target Bluetooth device is the first Bluetooth device or the second Bluetooth device.

If determining that a button operation of the fourth control signal matches the first button operation, the first screen device determines that the target screen device controlled by using the target Bluetooth device is the first screen device. Alternatively, if determining that a button operation of the fourth control signal matches the second button operation, the second screen device determines that the target screen device controlled by using the target Bluetooth device is the second screen device.

According to some embodiments, based on prompt information output by each screen device in the screen group, the user is guided to complete binding between a screen device and a Bluetooth device through a specific remote control operation, and the user can also control the to-be-removed screen device without distinguishing each Bluetooth device.

According to a second aspect, an embodiment of this application provides a communication system for controlling a plurality of screen devices. The communication system includes a first screen device and a second screen device in a same screen cluster, a first Bluetooth device connected to the first screen device through Bluetooth, and a second Bluetooth device connected to the second screen device through Bluetooth.

The first screen device is configured to: form a first screen group with the second screen device, determine that the first screen device is a primary control device of the first screen group, and send first instruction information to the second screen device. The first instruction information is used to instruct the second Bluetooth device to be communicatively connected to the first screen device.

In an embodiment, the first instruction information is further used to instruct the second screen device to share a received control signal with the first screen device.

In an embodiment, the first instruction information is used to instruct the second Bluetooth device to establish a Bluetooth connection to the first screen device, and the first screen device is further configured to:
establish the Bluetooth connection to the second Bluetooth device.

In an embodiment, the first instruction information is further used to instruct the second Bluetooth device to break a Bluetooth connection to the second screen device.

The second screen device is configured to:
release, by the second screen device, the Bluetooth connection to the second Bluetooth device based on the first instruction information.

In an embodiment, the first screen device is further configured to: detect a first screen combination operation; and
form the first screen group with the second screen device in response to the first screen combination operation.

In an embodiment, the first screen combination operation is an operation that is triggered by the user to physically splice the first screen device and the second screen device into a combined screen.

In an embodiment, before the first screen device forms the first screen group with the second screen device in response to the first screen combination operation, the first screen device is further configured to display first prompt information. The first prompt information indicates whether the first screen device forms a screen group with the second screen device.

The first Bluetooth device is configured to send a first control signal to the first screen device. The first control signal is used to indicate the first screen device to form the screen group with the second screen device.

In an embodiment, before the first screen device forms the first screen group with the second screen device, the first screen device is further configured to: discover each other with the second screen device, establish a network connection, and form a screen cluster. A screen device in the screen cluster shares device information and pairing information of the screen device and a Bluetooth device paired with the screen device.

In an embodiment, the first screen device is further configured to:
determine, through negotiation with the second screen device, that the first screen device is a screen device with an optimal resource, and determine that the first screen device is a primary control device of the first screen group, where the screen device with the optimal resource is determined based on performance of the screen device and a primary control identifier.

In an embodiment, after the first screen device establishes the Bluetooth connection to the second Bluetooth device, the first screen device is further configured to: receive a first control signal sent by a target Bluetooth device, where the target Bluetooth device is the first Bluetooth device or the second Bluetooth device, and the first control signal is used to operate to-be-displayed content of the first screen group;
divide the to-be-displayed content into a first part and a second part based on the first control signal;
send a first control instruction to the second screen device, where the first control instruction is used to instruct the second screen device to display the second part of the to-be-displayed content; and
display the first part.

The second screen device is further configured to display the second part.

In an embodiment, after the first screen device establishes the Bluetooth connection to the second Bluetooth device, the first screen device is further configured to:
receive a second control signal sent by a target Bluetooth device, where the target Bluetooth device is the first Bluetooth device or the second Bluetooth device, and the second control signal is used to perform a control operation on each screen device in the first screen group; and
send a second control instruction corresponding to the second control signal to the second screen device, where the second control instruction is used to instruct the second screen device to perform the control operation; perform the control operation.

The second screen device is further configured to perform the control operation according to the second control instruction.

In an embodiment, the communication system further includes a third screen device and a third Bluetooth device connected to the third screen device through Bluetooth. The first screen device is further configured to: obtain second instruction information, where the second instruction information is used to instruct to add the third screen device to the first screen group; detect a second screen combination operation; form a second screen group with the second screen device and the third screen device in response to the second screen combination operation; determine a primary control device of the second screen group with the second screen device and the third screen device; and if the first screen device is the primary control device in the second screen group, send the second instruction information to the third screen device. The second instruction information is used to instruct the third screen device to break the Bluetooth connection to the third Bluetooth device. The third screen device is configured to release the Bluetooth connection to the third Bluetooth device based on the second instruction information. The first screen device is further configured to establish a Bluetooth connection to the third Bluetooth device.

In an embodiment, the first screen group further includes a fourth screen device, and the first screen device is further connected to the fourth Bluetooth device. The first screen device is further configured to receive fourth instruction information. The fourth instruction information is used to instruct to remove a fifth screen device from the first screen group. The fifth screen device is any one of the first screen device, the second screen device, or the fourth screen device. The fifth screen device is further configured to: if the fifth screen device is the second screen device or the fourth screen device, establish connections to the first Bluetooth device, the second Bluetooth device, and the fourth Bluetooth device respectively based on device information of the first Bluetooth device, device information of the second Bluetooth device, and device information of the fourth Bluetooth device.

In an embodiment, the fifth screen device is further configured to:
  receive a third control signal from a target Bluetooth device, where the target Bluetooth device is any one of the first Bluetooth device, the second Bluetooth device, or the fourth Bluetooth device; and
  perform binding to the target Bluetooth device, and break a connection to another Bluetooth device other than the target Bluetooth device.

In an embodiment, the first screen group further includes a fourth screen device, and the first screen device is further connected to the fourth Bluetooth device. The first screen device is further configured to receive fifth instruction information. The fifth instruction information is used to instruct to remove a sixth screen device and a seventh screen device from the first screen group. The sixth screen device is any one of the first screen device, the second screen device, or the fourth screen device. The seventh screen device is any one of the first screen device, the second screen device, or the fourth screen device except the sixth screen device.

The sixth screen device is further configured to: if the sixth screen device is the second screen device or the fourth screen device, establish connections to the first Bluetooth device, the second Bluetooth device, and the fourth Bluetooth device respectively based on device information of the first Bluetooth device, device information of the second Bluetooth device, and device information of the fourth Bluetooth device.

The seventh screen device is further configured to: if the seventh screen device is the second screen device or the fourth screen device, establish connections to the first Bluetooth device, the second Bluetooth device, and the fourth Bluetooth device respectively based on the device information of the first Bluetooth device, the device information of the second Bluetooth device, and the device information of the fourth Bluetooth device.

In an embodiment, the sixth screen device is further configured to: receive the third control signal from the target Bluetooth device; and determine, based on the third control signal, a first arrival angle formed by a receive antenna of the sixth screen device and the second Bluetooth device, and a first distance between the sixth screen device and the target Bluetooth device.

The seventh screen device is further configured to: receive the third control signal from the target Bluetooth device; determine, based on the third control signal, a second arrival angle formed by a receive antenna of the seventh screen device and the target Bluetooth device, and a second distance between the seventh screen device and the target Bluetooth device; and determine, based on the first arrival angle and the second arrival angle, and/or the first distance and the second distance, a target screen device controlled by using the target Bluetooth device.

In an embodiment, after the fifth screen device establishes the connections respectively to the first Bluetooth device, the second Bluetooth device, and the fourth Bluetooth device, the first screen device is further configured to: display first prompt information, and receive a fourth control signal from a target Bluetooth device, where the target Bluetooth device is any one of the first Bluetooth device, the second Bluetooth device, or the fourth Bluetooth device, and the first prompt information is used to prompt a button operation for binding the first screen device; and if determining that the button operation of the fourth control signal matches the button operation displayed by the first screen device, determine that a target screen device controlled by using the target Bluetooth device is the first screen device.

The second screen device is further configured to: display second prompt information, and receive the fourth control signal from the target Bluetooth device, where the second prompt information is used to prompt a button operation for binding the second screen device; and if determining that a button operation of the fourth control signal matches a button operation displayed by the second screen device, determine that a target screen device controlled by using the target Bluetooth device is the second screen device.

The fourth screen device is further configured to: display third prompt information, and receive a fourth control signal from a target Bluetooth device, where the third prompt information is used to prompt a button operation for binding the fourth screen device; and if determining that a button operation of the fourth control signal matches a button operation displayed by the fourth screen device, determine that a target screen device controlled by using the target Bluetooth device is the fourth screen device.

According to a third aspect, an embodiment of this application provides a computer-readable storage medium. The computer-readable storage medium stores program instructions. When the program instructions are run on an electronic device, the electronic device is enabled to perform the operations in the method in the first aspect and any possible design of the first aspect in embodiments of this application.

According to a fourth aspect, an embodiment of this application provides a computer program product. When the computer program product is run on an electronic device, the electronic device is enabled to perform the operations in the method in the first aspect and any possible design of the first aspect in embodiments of this application.

According to a fifth aspect, an embodiment of this application provides a chip. The chip is coupled to a memory in an electronic device, to control the electronic device to perform the operations in the method in the first aspect and any possible design of the first aspect in embodiments of this application.

In addition, for technical effect brought by the second aspect to the fifth aspect, refer to the related description of the method in the designs of the method part. Details are not described herein again.

BRIEF DESCRIPTION OF DRAWINGS

FIG. 13D-1 and FIG. 13D-2 are a sixth flowchart of a method for controlling a plurality of screen devices according to an embodiment of this application;

DESCRIPTION OF EMBODIMENTS

The following first explains and describes some terms in embodiments of this application.

In embodiments of this application, "at least one" means one or more, and "a plurality of" means two or more. In addition, it should be understood that in description of this application, terms such as "first" and "second" are merely used for distinctive description, but should not be understood as indicating or implying relative importance, or should not be understood as indicating or implying a sequence.

There are a plurality of screen devices at home. Each screen device has a matching Bluetooth remote control. Generally, a user may independently use a screen device in a room. When the user wants to use a larger screen to display content, the user may move the plurality of screen devices to a specific room (for example, a living room) for use in combination. The screen devices are spliced and combined into one combined screen (also referred to as a screen group system below). In this way, viewing experience of the user is improved. When the combined screen does not need to be used, the combined screen may be split into single screen devices for use.

An embodiment of this application provides a method for controlling a plurality of screen devices, so that a user controls a plurality of screen devices without adding a hardware device or module. The method may be applied to a scenario in which a plurality of screen devices are spliced into a combined screen, or may be applied to a scenario in which a combined screen is split into a plurality of screens for separate use. In the method for controlling a plurality of screen devices provided in this application, one primary control device may be determined from a plurality of screen devices, and another screen device and pairing information between each screen device and a Bluetooth device paired with the screen device are uniformly managed by using the primary control device, to implement data exchange with any Bluetooth device by using the primary control device, thereby facilitating control on the plurality of screen devices for the user.

The following describes implementations of embodiments of this application in detail with reference to the accompanying drawings.

Figure 1:
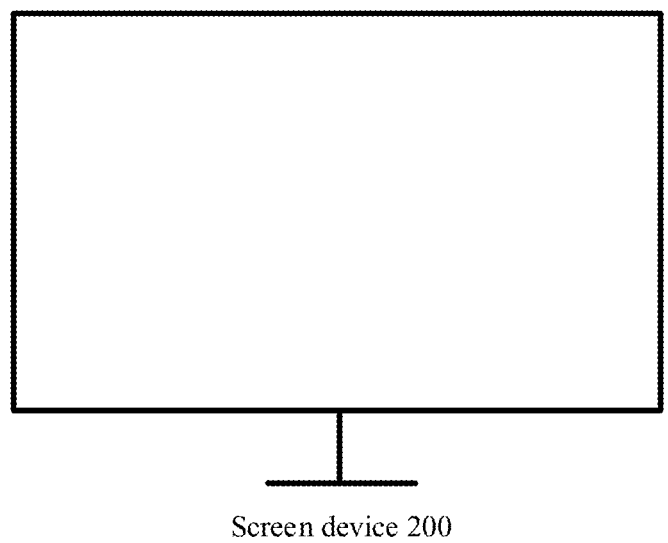
FIG. 1 is a schematic diagram of a communication system according to an embodiment of this application.
Figure 1:
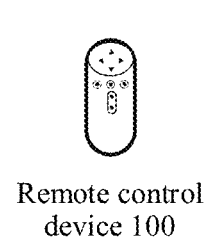

FIG. 1 is a schematic diagram of a communication system according to an embodiment of this application. The communication system includes at least one remote control device 100 and at least one screen device 200. The remote control device 100 may establish a Bluetooth connection to the screen device 200. Short-range data exchange may be implemented between the remote control device 100 and the screen device 200 through the Bluetooth connection.

The remote control device 100 in this embodiment of this application may be a Bluetooth device, for example, a touch-type remote control or a button-type remote control, or may be another device that can control a screen device, for example, an infrared remote control. This is not limited herein. The remote control may match the screen device. This may be understood as that the screen device can be controlled only by using a specific remote control. Alternatively, the remote control may be a general remote control. This may be understood as that the remote control can control all screen devices. This is not limited herein. The following uses an example in which the remote control device 100 is a Bluetooth device 100 for description.

The screen device 200 in this embodiment of this application may be a television, a computer, a mobile Internet device (MID), an in-vehicle device, a virtual reality (VR) device, an augmented reality (AR) device, a smart home device, or the like that has a display; or may be another device that has a display and that can establish a wireless communication connection. This is not limited herein. The screen device may carry iOS®, Android®, Microsoft®, or another operating system. This is not limited in this embodiment of this application.

For example, the communication system shown in FIG. 1 includes a plurality of screen devices. The screen devices may discover each other via a short-range network or a local area network. The screen devices that discover each other may be connected to each other via a network. In a manner, the screen devices may be connected to each other through Wi-Fi or Bluetooth, and the screen devices that are connected to each other may form an intra-network screen cluster (which may be briefly referred to as a screen cluster). In another manner, the screen devices that discover each other join a local area network, and form a screen cluster in one screen cluster. At least two screen devices are physically spliced to form a combined screen. The combined screen is referred to as a screen group system (which may be briefly referred to as a screen group).

The following provides description by using an example in which four screen devices (a screen A, a screen B, a screen C, and a screen D) form a screen group, and a Bluetooth device is a Bluetooth remote control.

Figure 2:
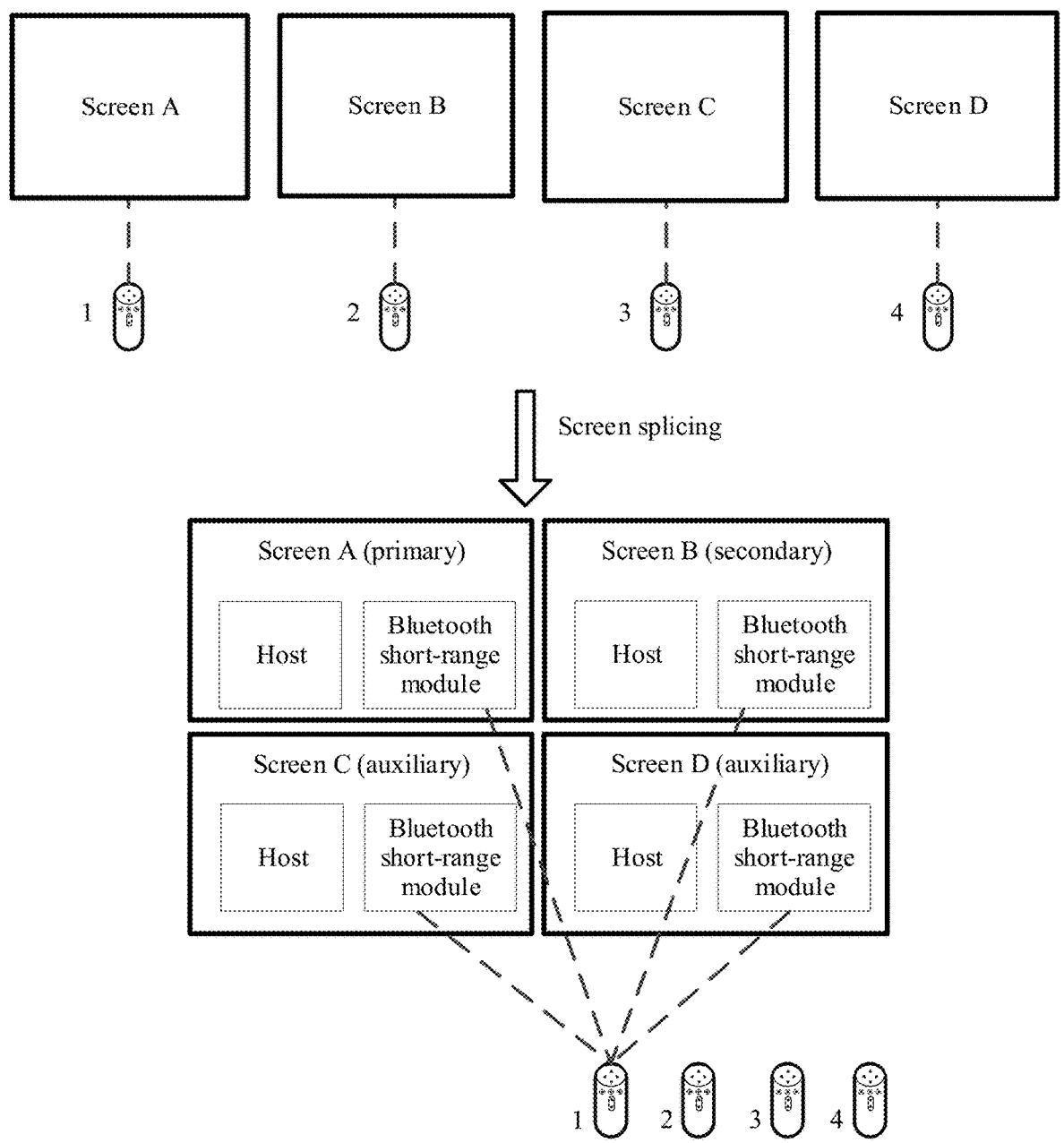
FIG. 2 is a schematic diagram of another communication system according to an embodiment of this application.

FIG. 2 is a schematic diagram of another communication system according to an embodiment of this application. The communication system includes a screen device A, a screen device B, a screen device C, a screen device D, a Bluetooth device 1 paired with the screen device A, a Bluetooth device 2 paired with the screen device B, a Bluetooth device 3 paired with the screen device C, and a Bluetooth device 4 paired with the screen device D.

As shown in FIG. 2, each screen device includes an independent host as a core processing module, and has a memory and a network communication function. A host of a primary control device (that is, the screen device A) establishes data connections to hosts of auxiliary devices (that is, the screen device B, the screen device C, and the screen device D) through a network, so that the host of the primary control device controls data transmission exchange in a combined screen device.

Each screen device further includes an independent Bluetooth short-range module that is connected to the host as a communication module. The Bluetooth short-range module is used for Bluetooth short-range communication. The Bluetooth short-range module of the screen device communicates with a Bluetooth short-range module of the Bluetooth device through a connection implemented by using a short-range wireless signal, to receive a control signal of the Bluetooth device. After receiving the control signal, the Bluetooth short-range module of the screen device cooperates with the host to complete signal processing, converts the control signal, and inputs the converted control signal to a screen combination control system as input of the screen combination control system to control interface browsing and an interface operation.

When each screen device is used for a first time after delivery, the host of the screen device may discover, through scanning by using the Bluetooth short-range module, a Bluetooth device matching the screen device, and be paired with the Bluetooth device. In a pairing process, the host of the screen device stores, in the memory, pairing information such as a media access control address (MAC) of the paired Bluetooth device. Then, each time the screen device is powered on, the screen device scans for, based on the stored pairing information of the Bluetooth device, the Bluetooth device corresponding to the pairing information. After finding, through scanning, the Bluetooth device corresponding to the pairing information, the screen device sends a pairing request to the Bluetooth device corresponding to the pairing information, and completes establishing a Bluetooth connection to the Bluetooth device after receiving a response message corresponding to the pairing request. Alternatively, after the screen is powered off, the Bluetooth remote control breaks the connection to the screen. After the screen is powered on again, the screen waits for the connection to the Bluetooth device. When the Bluetooth device receives a button operation again, the Bluetooth device is automatically reconnected to the screen. After receiving the button operation, the Bluetooth device sends, to the Bluetooth short-range module of the screen device through the Bluetooth connection, a control signal corresponding to the button operation. The Bluetooth short-range module of the screen device receives the control signal corresponding to the button operation, and sends, to the host of the screen device, the control signal corresponding to the button operation. The host of the screen device converts the control signal corresponding to the button operation into a button down/up event and a key value of the system, and then sends the button down/up event and the key value to an interface module, to control a user interface.

Because each screen device in the screen cluster actively scans for the Bluetooth device, before the screen devices form a screen group, the screen device is connected to the matching Bluetooth device. As shown in FIG. 2, the screen device A is connected to the Bluetooth device 1, the screen device B is connected to the Bluetooth device 2, the screen device C is connected to the Bluetooth device 3, and the screen device D is connected to the Bluetooth device 4.

When the screen device A, the screen device B, the screen device C, and the screen device D are spliced to form the screen group, a network connection between screen devices is first established for the screen group according to a screen device discovery protocol, and then a cross-device screen group splicing management service is established based on the network connection. Then, the screen group splicing management service of the primary control device establishes a control information table of the combined screen. The table includes a quantity of screens, an identifier ID, a primary/secondary flag, orientation information, pairing information of a Bluetooth device, and the like. As shown in FIG. 2, the screen device A is the primary control device of the screen group, and the screen device B, the screen device C, and the screen device D are auxiliary devices (which may also be referred to as secondary devices). In a running process of the screen group system, the screen device A generates a control information table (referring to Table 1 to Table 3) based on basic information of the combined screen maintained by the screen group splicing management service, and implements an arrangement displayed as image output, and focus switching in an interface, browsing, operation control, and the like based on input of a Bluetooth device.

When a screen splicing relationship changes, for example, a screen device is newly added to the screen group, or some screen devices in the combined screen are removed, the screen group splicing management service of the primary control device maintains and refreshes the basic information of the combined screen, and switches a Bluetooth device to control a connection. In a scenario of switching the primary control device in the system, the screen group splicing management service of the original primary control device controls the primary control device to break the connection to the paired Bluetooth device, and notifies a new primary control device of pairing information of the Bluetooth device for controlling the current screen group. A screen group splicing management service of the new primary control device controls the entire screen group. The new primary control device is paired with and connected to the Bluetooth device for controlling the current screen group based on the pairing information of the Bluetooth device for controlling the current screen group, and updates and saves the refreshed control information table. The new primary control device may receive a control signal of the Bluetooth device for controlling the current screen group, to control the screen group. After some screen devices are removed from the screen group, the control information table is refreshed, and a control mode is changed to independent control. Reconnection scanning starts when the device is powered on or the screen is turned on, or the like. Reconnection is performed based on a Bluetooth device in a stored Bluetooth MAC whitelist of Bluetooth devices. A many-to-many Bluetooth connection is established between an independent screen device and a Bluetooth device. When a Bluetooth device receives a button operation, the Bluetooth device sends, to a plurality of independent screen devices, a control signal corresponding to the button operation. Each screen device detects a distance and an angle between a Bluetooth signal of the Bluetooth device and the screen device, and sends the angle and the distance to a screen group control service for unified comparison, so that the screen group control service selects, as a receive screen, a screen that is at an angle close to a right angle to the Bluetooth device and that is closest to the Bluetooth device. In addition, a prompt indicating control of the Bluetooth device and binding of the Bluetooth device is displayed on the corresponding screen. Pairing information of the Bluetooth device is recorded based on the prompt.

The following describes the screen cluster in detail with reference to a specific example.

Figure 3:
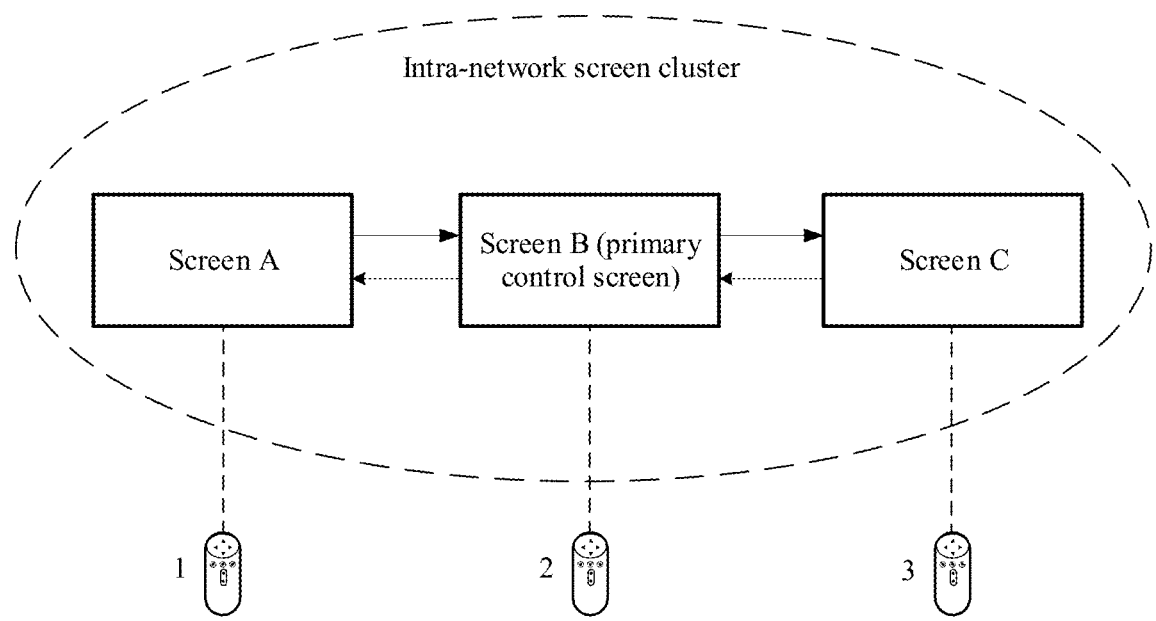
FIG. 3 is a schematic diagram of still another communication system according to an embodiment of this application.

FIG. 3 is a schematic diagram of still another communication system according to an embodiment of this application. As shown in FIG. 3, the communication system includes a screen cluster including a screen A, a screen B, and a screen C; and a Bluetooth device 1 paired with the screen A, a Bluetooth device 2 paired with the screen B, and a Bluetooth device 3 paired with the screen C. The three Bluetooth remote controls each may serve as a shared Bluetooth device for the screen cluster.

Screen devices in the screen cluster may share device information, for example, information about a screen device and information about a Bluetooth device paired with the screen device. There may be a plurality of specific sharing manners. The following provides two embodiments.

In an embodiment, as shown in FIG. 3, device information is exchanged between the screen A, the screen B, and the screen C in the screen cluster.

In another implementation, in the screen cluster, the screen A, the screen B, and the screen C may negotiate to determine one screen as a primary control device of the screen cluster. For example, the screen B serves as the primary control device of the screen cluster, receives device information sent by each auxiliary device (the screen A and the screen C), and then shares the device information with all the auxiliary devices.

For example, a specific negotiation manner may be as follows: A screen with an optimal resource is selected from the screen cluster as the primary control device through weighted scoring based on factors of a central processing unit (CPU)/random access memory (RAM), and the like. If the primary control device is powered off, a screen device with an optimal resource is selected through negotiation from other screen devices included in the screen cluster as the primary control device of the screen cluster. For example, as shown in FIG. 3, the screen A, the screen B, and the screen C negotiate with each other to determine that the screen B is the primary control device, and the screen A and the screen C are all auxiliary screens. A user may operate a Bluetooth remote control paired with the primary control device of the screen cluster, that is, operate the Bluetooth remote control 2 paired with the screen B, to implement control and information management for each screen in the screen cluster.

After the primary control device of the screen cluster is determined, the primary control device of the screen cluster may manage information about all the screens in the screen cluster and the Bluetooth remote controls, save a control information table, and share the control information table with the auxiliary screen in the screen cluster. For example, content in the control information table may include a screen list: Screen A, Screen B, and Screen C. For another example, content in the control information table may include a MAC list of Bluetooth remote controls: MAC 1, MAC 2, and MAC 3. For another example, the screen B may obtain pairing information of the screen A and the Bluetooth remote control 1, that is, Screen A: MAC 1; and may further obtain pairing information of the screen C and the Bluetooth remote control 2, that is, Screen C: MAC 3. In other words, content in the control information table may include a map table between a remote control and a screen (RcuScreenMap): Screen A: MAC 1, Screen B: MAC 2, and Screen C: MAC 3. The control information table may be alternatively any combination of the foregoing several types of content.

In addition, the primary control device of the screen cluster may update the control information table stored by the primary control device, and synchronize the updated control information table to each auxiliary screen in the screen cluster after updating the control information table. For example, for the control information table, refer to Table 1.

TABLE 1

| Screen cluster | Screen list (ScreenList) | Screen A, Screen B, Screen C |
|---|---|---|
| | MAC list of Bluetooth remote controls (RcuMacList) | MAC 1, MAC 2, MAC 3 |
| | Map list between a remote control and a screen (RcuScreenMap) | Screen A: MAC 1, Screen B: MAC 2, Screen C: MAC 3 |
| | Connection map list (ConnectMap) | A: 1, B: 2, C: 3 |

Based on the foregoing content, the following describes a screen control method that may specifically include three scenarios.

Scenario 1: A plurality of screen devices are spliced into one combined screen (namely, a screen group).

Scenario 2: A screen device is newly added when a screen group is used.

Scenario 3: A screen group when being used is split into a plurality of independent screen devices.

The following separately describes the foregoing three scenarios.

Scenario 1: For the scenario in which a plurality of screen devices are spliced into one combined screen, an example in which the scenario includes three screen devices and three Bluetooth devices is used to describe a screen control process from independent using the plurality of screen devices to splicing the screen devices into the combined screen.

Figure 4:
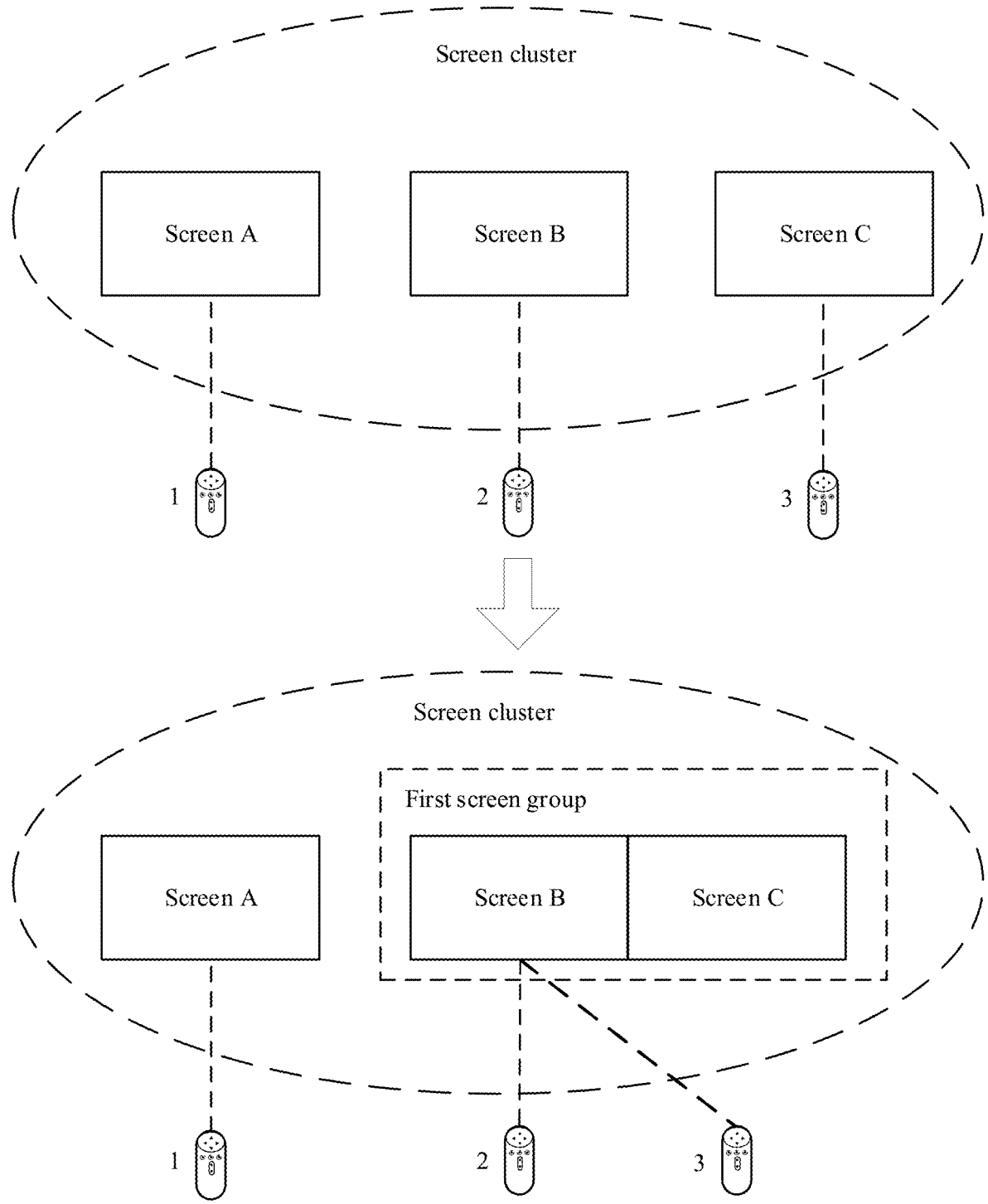
FIG. 4 is a schematic diagram of an example scenario to which a method for controlling a plurality of screen devices is applicable according to an embodiment of this application.

For example, FIG. 4 is a schematic diagram of an example scenario to which a method for controlling a plurality of screen devices is applicable according to an embodiment of this application. In FIG. 4, a screen A, a screen B, and a screen C in a same screen cluster are respectively connected to paired Bluetooth devices. The screen A is connected to a Bluetooth device 1, the screen B is connected to a Bluetooth device 2, and the screen C is connected to a Bluetooth device 3. When a user moves two screen devices (for example, the screen B and the screen C) together and splices the two screen devices into one combined screen for use, the screen A is an independent screen, and the screen B and the screen C form a first screen group. The screen devices included in the first screen group may negotiate with each other to determine one screen as a primary control device of the screen group, and other screens as auxiliary screens. For a negotiation manner of the primary control device of the screen group, refer to the foregoing negotiation manner of the primary control device of the screen cluster. Details are not described herein again.

After the primary control device of the screen group is determined, the primary control device of the screen group may manage information about all the screen devices in the screen group and information about the Bluetooth devices paired with the screen devices, and share, with the auxiliary screen in the screen group, device information corresponding to the screen group and the information about the Bluetooth devices paired with the screen devices. In this embodiment of this application, the primary control device of the screen group is connected to all the Bluetooth devices corresponding to the screen group. The user may operate any one of all the Bluetooth devices corresponding to the screen group. For example, the screen B is the primary control device of the screen group, and the screen C is the auxiliary screen. In this case, the Bluetooth device 2 and the Bluetooth device 3 are operated, to implement control and information management for each screen in the screen group.

It should be noted that the primary control device of the screen group and a primary control device of the screen cluster may be a same screen device, for example, both are the screen B. Alternatively, the primary control device of the screen group and the primary control device of the screen cluster may be different screen devices. For example, the primary control device of the screen cluster is the screen A, and the primary control device of the screen group is the screen B.

The following uses an example in which three screen devices form a screen cluster, to describe a method for controlling a plurality of screen devices.

Figure 5:
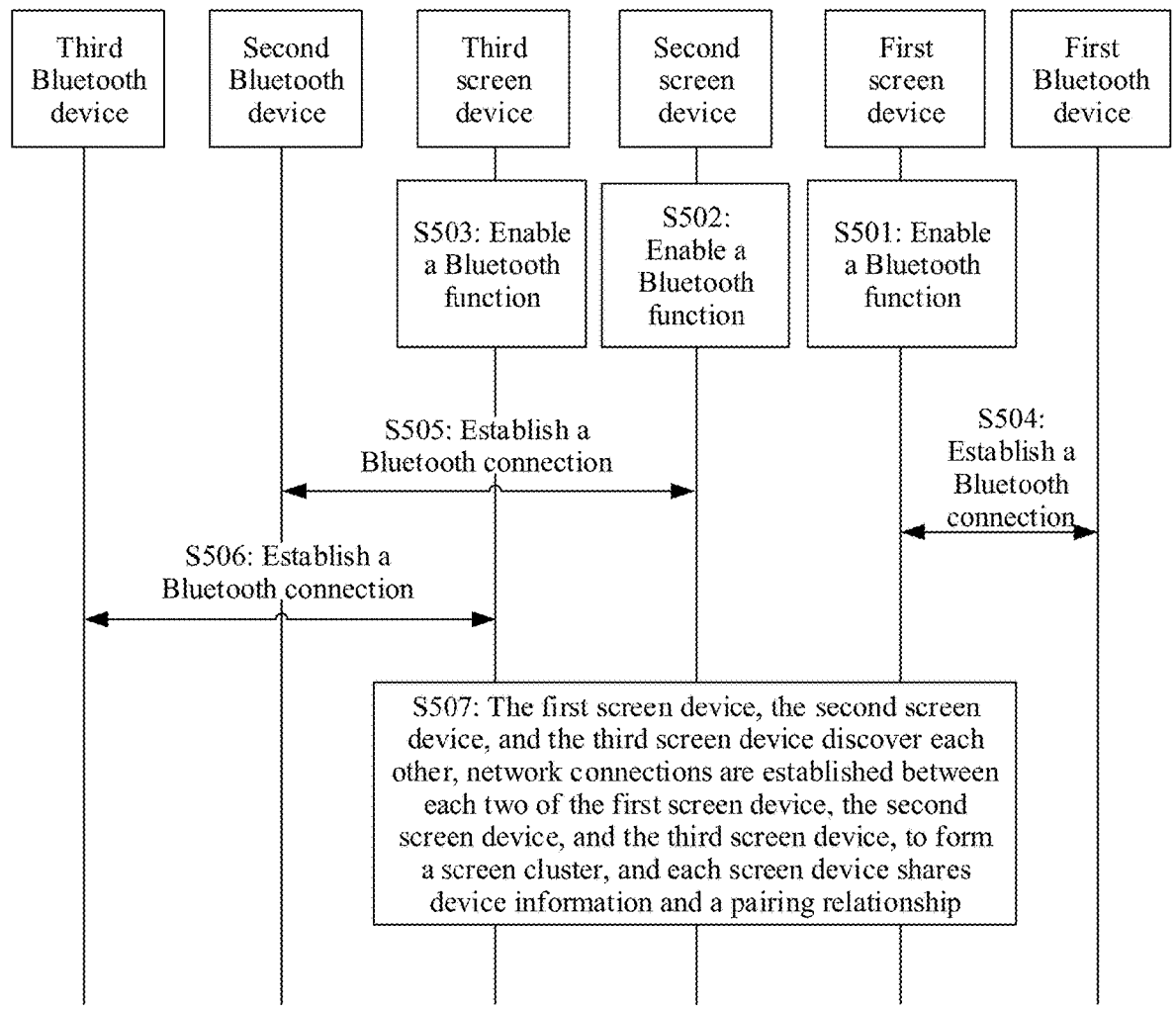
FIG. 5 is a first flowchart of a method for controlling a plurality of screen devices according to an embodiment of this application.

FIG. 5 is a first flowchart of a method for controlling a plurality of screen devices according to an embodiment of this application. The example shown in FIG. 5 may be applied in the scenario shown in FIG. 4. In the example shown in FIG. 5, a first screen device may be the screen B, a second screen device may be the screen C, and a third screen device may be the screen A. Specifically, a specific procedure of this example may include the following operations.

Operation S501: The first screen device enables a Bluetooth function.

The following describes specific implementation in which the first screen device enables the Bluetooth function.

When the first screen device is used for a first time, the first screen device may be turned on in response to an on/off button operation for the first screen device. After the first screen device is powered on, each module of the first screen device is in a working state. For example, if a Bluetooth short-range module is in a working state, the first screen device enables the Bluetooth function.

In some embodiments, after the Bluetooth function of the first screen device is enabled, the first screen device may enter a Bluetooth scanning state, and a host of the screen device scans for a surrounding available device by using the Bluetooth short-range module. In some embodiments, a specific broadcast, that is, a broadcast including a Bluetooth address of a Bluetooth remote control may be further sent, to connect to a paired Bluetooth device. In some other embodiments, alternatively, through a button of a Bluetooth device, the Bluetooth device may be triggered to actively establish a connection to the screen device.

Operation S502: The second screen device enables a Bluetooth function.

Operation S503: The third screen device also enables a Bluetooth function.

For specific implementation in which the second screen device and the third screen device each enable the Bluetooth function, refer to the related description of enabling the Bluetooth function by the first screen device in operation S501.

Operation S504: The first screen device establishes a Bluetooth connection to a matching first Bluetooth device.

The following describes specific implementation in which the first screen device establishes the Bluetooth connection to the first Bluetooth device.

If the first screen device periodically broadcasts Bluetooth information, after the first Bluetooth device is powered on and receives the Bluetooth information, the first Bluetooth device may send a pairing request to the first screen device based on the Bluetooth information. After receiving the pairing request, the first screen device may return, to the first Bluetooth device, a response message indicating a pairing success, so that the Bluetooth short-range module in the first screen device is successfully paired with a Bluetooth short-range module of the first Bluetooth device, thereby establishing the Bluetooth connection.

Alternatively, the first Bluetooth device may periodically broadcast Bluetooth information after being powered on. After enabling the Bluetooth function of the first screen device, the first screen device periodically scans for the Bluetooth information. If the first screen device finds, through scanning, the Bluetooth information broadcast by the first Bluetooth device, the first screen device may send a pairing request to the first Bluetooth device. After receiving the pairing request, the first Bluetooth device may return, to the first screen device, a response message indicating a pairing success, so that the Bluetooth short-range module in the first screen device is successfully paired with a Bluetooth short-range module of the first Bluetooth device, thereby establishing the Bluetooth connection.

Figure 6:
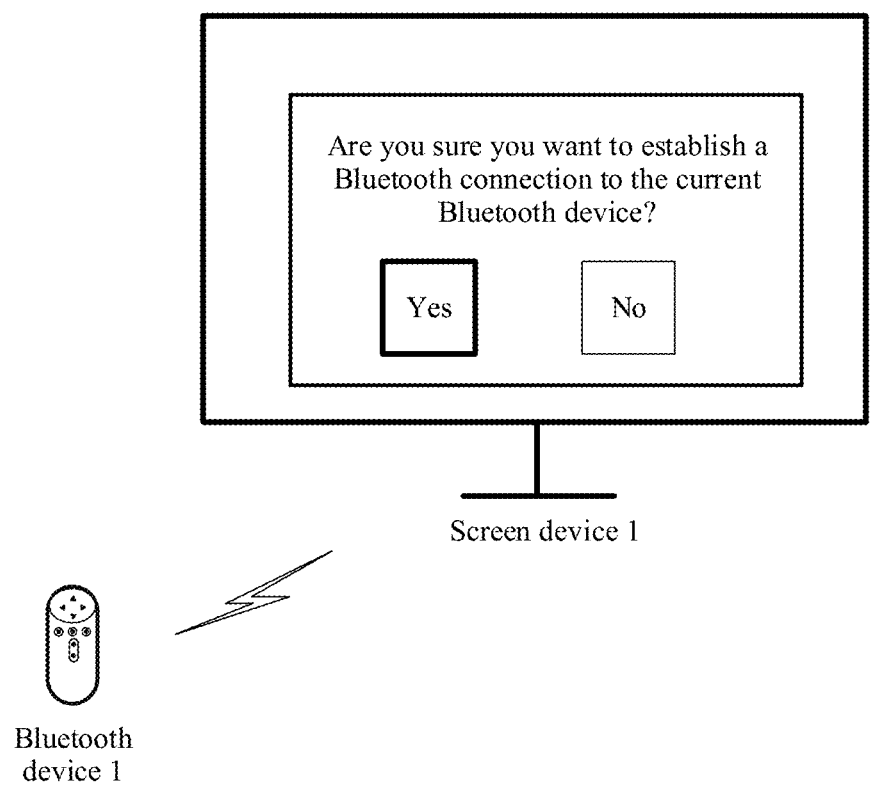
FIG. 6 is a schematic diagram of an interface according to an embodiment of this application.

In a scenario in which the first screen device is connected to the matching first Bluetooth device for a first time, identification information of the screen device may be preset in the first Bluetooth device, for example, a MAC address of the first screen device, a name of the first screen device, or a unique identifier of the first screen device. After being powered on, the Bluetooth device may directly page the first screen device based on the preset identifier of the first screen device, to quickly establish the Bluetooth connection to the first screen device. In some other embodiments, the pairing between the first screen device and the Bluetooth device may also be performed in a proximity pairing manner. To be specific, when a distance between the first screen device and the Bluetooth device is less than a first threshold, or a received signal strength indication (received signal strength indication, RSSI) value is greater than or equal to a preset threshold, prompt information may be displayed on a display of the first screen device. The prompt information is used to indicate whether to establish a Bluetooth connection to the first Bluetooth device. As shown in FIG. 6, the prompt information may be displayed on the display of the first screen device in a pop-up box manner. The pop-up box may further include a Yes control and a No control. Operations performed on different controls by a user are received by using the first Bluetooth device. The first screen device may respond to different operations. For example, when the first Bluetooth device receives operations performed by the user on a direction button and a confirm button of the remote control to select the Yes control, the first screen device sends the pairing request to the first Bluetooth device, to establish the Bluetooth connection to the first Bluetooth device; or when the user selects the No control, the first screen device does not trigger a pairing process with the first Bluetooth device.

When the screen device is used for a first time, the host of the screen device is bound to and paired with the Bluetooth device by using the Bluetooth short-range module. In the pairing process, the screen device stores Bluetooth MAC whitelist information of the Bluetooth device paired with the screen device, and the Bluetooth device stores Bluetooth MAC whitelist information of the screen device paired with the Bluetooth device, so that the screen device and the Bluetooth device maintain a pairing relationship and perform a reconnection operation after the connection is broken. When the screen device is powered on again for use, the screen device may scan for the Bluetooth device based on the stored Bluetooth MAC whitelist information of the Bluetooth device paired with the screen device, be reconnected to the Bluetooth device, and establish a wireless signal connection to the Bluetooth device.

Operation S505: The second screen device establishes a Bluetooth connection to a matching second Bluetooth device.

Operation S506: The third screen device establishes a Bluetooth connection to a matching third Bluetooth device.

For specific implementation in which the second screen device and the third screen device each establish the Bluetooth connection to the matching Bluetooth device, refer to the related description of establishing the Bluetooth connection to the matching first Bluetooth device by the first screen device in operation S504.

After each screen device establishes a Bluetooth connection to each Bluetooth device, data exchange may be performed via the Bluetooth connection. After receiving a button operation, the Bluetooth device sends, to the screen device through the Bluetooth connection, a control signal corresponding to the button operation. After the Bluetooth short-range module of the screen device receives the control signal, the control signal corresponding to the button operation is converted into a button down/up event and a key value of the system, and then the button down/up event and the key value are sent to an interface module, to control an interface.

Operation S507: The first screen device, the second screen device, and the third screen device discover each other. Network connections are established between each two of the first screen device, the second screen device, and the third screen device, to form a screen cluster. Each screen device in the screen cluster shares device information and a pairing relationship.

The device information includes information about the screen device and information about the Bluetooth device paired with the screen device. The pairing relationship includes a pairing relationship between the screen device and the Bluetooth device.

The following uses an example in which the first screen device discovers the second screen device, to describe specific implementation in which the screen devices discover each other.

In some embodiments, the first screen device may discover the second screen device in a short-range proximity discovery manner. To be specific, when the first screen device determines that a distance to the second screen device is less than the first threshold, or when the first screen device detects that an RSSI value of a Bluetooth broadcast sent by the second screen device is greater than or equal to the preset threshold, the first screen device discovers the second screen device. Correspondingly, the second screen device may also discover the first screen device in the proximity discovery manner.

In some other embodiments, the first screen device may send a Bluetooth broadcast. After receiving the Bluetooth broadcast, the second screen device sends a response message to the first screen device. The first screen device receives the response message sent by the second screen device, that is, discovers the second screen device. Correspondingly, the second screen device may also send a Bluetooth broadcast. After receiving the Bluetooth broadcast from the second screen device, the first screen device sends a response message to the second screen device. The second screen device receives the response message, that is, discovers the first screen device.

After discovering another nearby screen device, each screen device may establish a nearby device list. After the screen devices discover each other, a network connection is established between any two screen devices, to form the screen cluster. An example in which the first screen device establishes the network connection to the second screen device is used to describe a process of establishing the network connection between any two screen devices. Specifically, first, the first screen device sends a connection request to the second screen device. The connection request includes the identifier of the first screen device. After receiving the connection request, the second screen device sends a connection response to the first screen device. The connection response includes an identifier of the second screen device. The first screen device receives the connection response from the second screen device, and completes establishing the network connection to the second screen device.

In operation S507, there are a plurality of embodiments of sharing the device information and the pairing relationship between the screen devices in the screen cluster.

In an embodiment, the screen devices in the screen cluster may exchange device information and the pairing relationship with each other. For example, the first screen device and the second screen device exchange the device information and the pairing relationship. The second screen device sends the identifier of the second screen device, an identifier of the second Bluetooth device, and a pairing relationship between the second screen device and the second Bluetooth device to the first screen device. Correspondingly, the first screen device may send the identifier of the first screen device, an identifier of the first Bluetooth device, and a pairing relationship between the first screen device and the first Bluetooth device to the second screen device.

In another possible implementation, after the first screen device, the second screen device, and the third screen device form the screen cluster, a primary control device of the screen cluster may be determined; and the primary control device of the screen cluster receives the device information and the pairing relationship that are sent by each auxiliary device, and then shares the device information and the pairing relationship with each auxiliary device. For example, the first screen device is the primary control device of the screen cluster, and the second screen device and the third screen device are auxiliary screens. The first screen device, as the primary control device of the screen cluster, may receive the identifier of the second screen device, the identifier of the second Bluetooth device, and the pairing relationship between the second screen device and the second Bluetooth device that are sent by the second screen device, and receive an identifier of the third screen device, an identifier of the third Bluetooth device, and a pairing relationship between the third screen device and the third Bluetooth device that are sent by the third screen device. Then, the first screen device sends the identifier of the first screen device, the identifier of the first Bluetooth device, the pairing relationship between the first screen device and the first Bluetooth device, the identifier of the third screen device, the identifier of the third Bluetooth device, and the pairing relationship between the third screen device and the third Bluetooth device to the second screen device. The first screen device sends the identifier of the first screen device, the identifier of the first Bluetooth device, the pairing relationship between the first screen device and the first Bluetooth device, the identifier of the second screen device, the identifier of the second Bluetooth device, and the pairing relationship between the second screen device and the second Bluetooth device to the third screen device.

The following uses an example in which two screen devices (that is, the first screen device and the second screen device) in the screen cluster form a screen group, to describe a method for controlling a plurality of screen devices.

Figure 7:
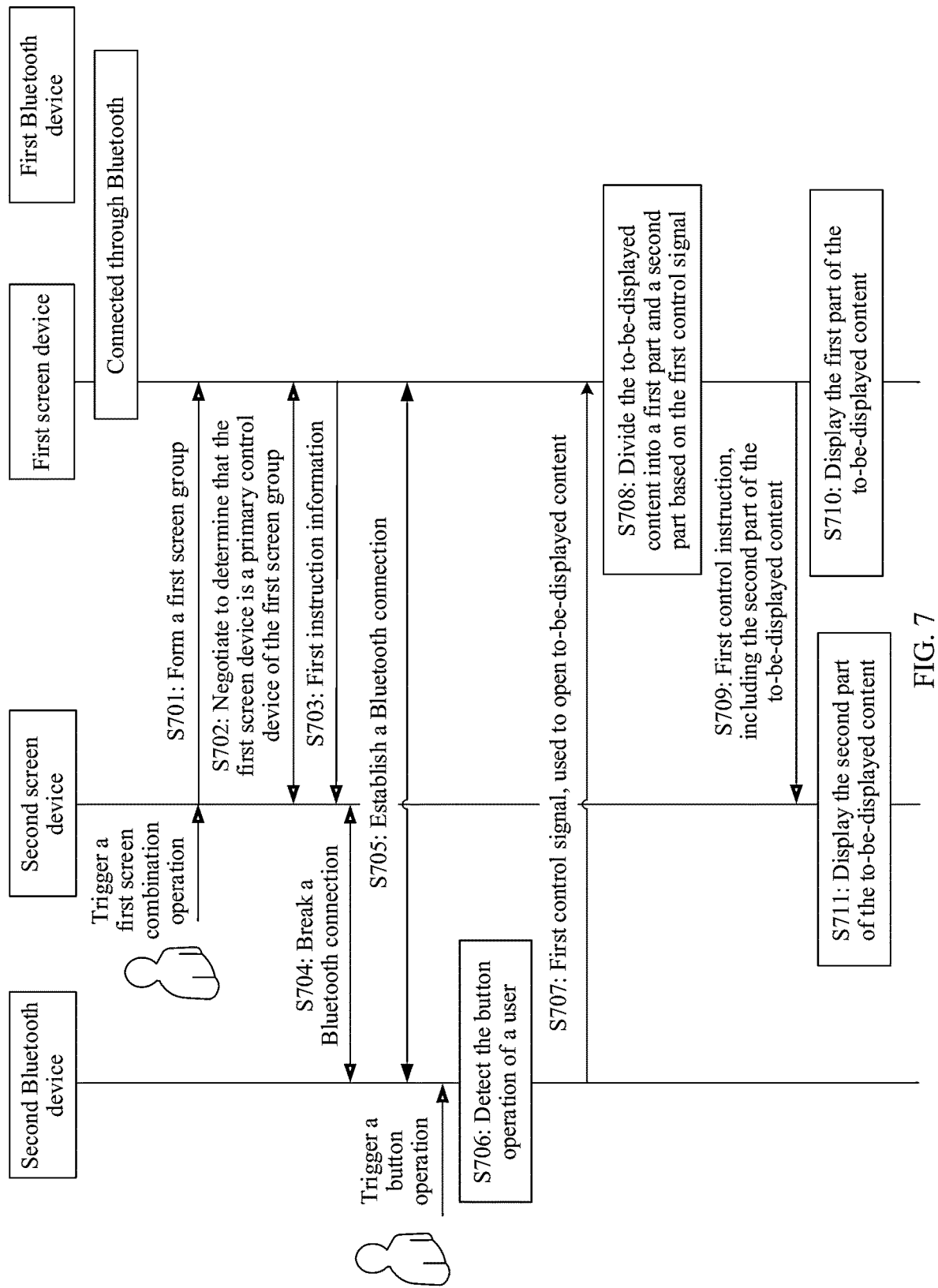
FIG. 7 is a second flowchart of a method for controlling a plurality of screen devices according to an embodiment of this application.

FIG. 7 is a second flowchart of a method for controlling a plurality of screen devices according to an embodiment of this application. The example shown in FIG. 7 may be applied in the scenario shown in FIG. 4. In the example shown in FIG. 7, a first screen device may be the screen B, and a second screen device may be the screen C. Specifically, a specific procedure of this example may include the following operations.

Operation S701: The second screen device detects a first screen combination operation for the first screen device and the second screen device, and forms a first screen group with the first screen device in response to the first screen combination operation.

In an example, the first screen combination operation is an operation that is triggered by a user to physically splice the first screen device and the second screen device. The first screen device may detect the first screen combination operation in a short-range proximity discovery manner. For example, if the first screen device detects that a distance between the second screen device and the first screen device is less than or equal to a second threshold, the first screen device determines to trigger a screen combination operation, and the first screen device and the second screen device form the first screen group.

In some other embodiments, the first screen combination operation may be a button operation of the user. For example, when the screen device receives the button operation for the screen device, the first screen device and the second screen device form the screen group in response to the button operation.

In this example, a screen cluster includes one independent screen and one screen group, that is, a third screen device and the first screen group. The first screen group includes two screen devices: respectively the first screen device and the second screen device. In some other embodiments, one screen cluster may alternatively include a plurality of screen groups, and one screen group may alternatively include a plurality of screen devices.

Operation S702: The first screen device and the second screen device negotiate to determine that the first screen device is a primary control device of the first screen group.

In an embodiment, a manner in which the first screen device and the second screen device negotiate to determine the primary control device of the first screen group may be as follows: A screen device with an optimal resource is selected from the first screen group as the primary control device through weighted scoring based on factors such as a central processing unit (central processing unit, CPU)/random access memory (random access memory, RAM). For example, in operation S702, the first screen device is the screen device with the optimal resource in the first screen group, so that the first screen device is determined as the primary control device of the first screen group.

In some other embodiments, after the first screen device, the second screen device, and the second screen device form the screen cluster, the primary control device of the screen cluster may be first determined through negotiation. For example, that the primary control device of the screen cluster is the first screen device indicates that the first screen device is the screen device with the optimal resource in the first screen device and the second screen device. Therefore, in the first screen group formed by the first screen device and the second screen device in operation S701, the first screen device is also the screen device with the optimal resource in the first screen group. Therefore, after the first screen group is formed, the first screen device may be determined as the primary control device of the first screen group without further negotiation. For another example, the primary control device of the screen cluster is the third screen device. In this case, after the first screen device and the second screen form the first screen group, the primary control screen of the first screen group needs to be determined through further negotiation. For a specific negotiation manner, refer to the manner of determining the primary control device of the first screen group in operation S702. Details are not described herein again.

In this embodiment of this application, if the screen device periodically broadcasts Bluetooth information, operations S504 to S506 may also be performed after operation S702. To be specific, after the first screen device and the second screen device determine the primary control device, the first screen device establishes a Bluetooth connection to a first Bluetooth device, and the second screen device establishes a Bluetooth connection to a second Bluetooth device.

Operation S703: The first screen device sends first instruction information to the second screen device. The first instruction information is used to instruct the second screen device to break the Bluetooth connection to the second Bluetooth device.

Operation S704: The second screen device breaks the Bluetooth connection to the second Bluetooth device.

In operation S701, the second screen device may send a Bluetooth connection release request to the second Bluetooth device. After receiving the Bluetooth connection release request, the second Bluetooth device sends a Bluetooth connection release response to the second screen device. The second screen device receives the Bluetooth connection release response, that is, completes breaking the Bluetooth connection to the second Bluetooth device. In this embodiment of this application, breaking the Bluetooth connection may also be understood as releasing the Bluetooth connection. Details are not described again below. For example, in operation S704, that the second screen device breaks the Bluetooth connection to the second Bluetooth device may be replaced with a case in which the second screen device releases the Bluetooth connection to the second Bluetooth device.

Operation S705: The first screen device establishes a Bluetooth connection to the second Bluetooth device.

In operation S705, the first screen device scans for a nearby Bluetooth device, and establishes the Bluetooth connection to the second Bluetooth device after discovering the second Bluetooth device.

With reference to FIG. 4, the following uses an example in which the first screen device is the screen B and the second screen device is the screen C to describe a Bluetooth device management method in a process in which the screen B and the screen C form the first screen group.

As shown in FIG. 4, the screen B is connected to a remote control 2, and the screen C is connected to a remote control 3. In the process in which the screen B and the screen C are spliced to form the first screen group, the screen B reads the first screen group list from the control information table (Table 1), that is, Screen B, Screen C; and screens an auxiliary screen from the first screen group list. In this example, there is only one auxiliary screen, that is, the screen C (Screen C) in the first screen group. Then, a MAC address of a remote control corresponding to the auxiliary screen is found in the map list between a remote control and a screen in Table 1. It can be learned from the found Screen C: MAC 3 that the MAC address corresponding to the screen C is MAC 3. The screen B controls, based on MAC 3, the screen C to break a Bluetooth connection to the remote control 3, and instructs the remote control 3 to enter a scanning and receiving state. Then, a Bluetooth short-range module of the screen B is actively paired with the remote control 3 and establishes a Bluetooth connection to the remote control 3. In this case, as shown in FIG. 4, the screen B is connected to both the remote control 2 and the remote control 3. Then, the screen B refreshes the connection map list, and refreshes "A: 1, B: 2, C: 3" in Table 1 to "A: 1, B: 2&3". Therefore, the control information table shown in Table 1 may be updated to Table 2.

TABLE 2

| Screen cluster | Screen list (ScreenList) | Screen A, Screen B, Screen C |
|---|---|---|
| | First screen group list (JointList) | Screen B (primary), Screen C |
| | MAC list of Bluetooth remote controls (RcuMacList) | MAC 1, MAC 2, MAC 3 |
| | Map list between a remote control and a screen (RcuScreenMap) | Screen A: MAC 1, Screen B: MAC 2, Screen C: MAC 3 |
| | Connection map list (ConnectMap) | A: 1, B: 2&3 |

Then, the screen B synchronizes Table 2 to another screen device in the first screen group. In other words, Table 2 is synchronously stored in the screen C in the first screen group.

After the first screen device establishes the Bluetooth connection to the second Bluetooth device, the first screen device has established the Bluetooth connections respectively to the first Bluetooth device and the second Bluetooth device. The user may operate either of the first Bluetooth device and the second Bluetooth device to control the primary control device, that is, control the first screen device, thereby controlling the first screen group.

The following provides description by using an example of operating the second Bluetooth device. Refer to operations S704 to S706.

Operation S706: The second Bluetooth device detects a button operation of the user.

There are many buttons on the second Bluetooth device. The user may perform button operations on different buttons to trigger different control signals.

Operation S707: The second Bluetooth device sends a first control signal to the first screen device.

In an embodiment, the first control signal is used for an operation on to-be-played content of the first screen group, for example, a click-to-play operation for the to-be-played content, adjustment for a playback speed, for example, from 1× to 2×, an operation of switching from one program source to another program source, or a channel switching operation of switching from one channel logo to another channel logo.

In this implementation, after receiving the first control signal, the Bluetooth short-range module of the first screen device sends the first control signal to a host of the first screen device. After processing the to-be-played content based on the first control signal, the host of the first screen device sends processed content to the auxiliary device in a multicast or broadcast manner, and sends a first control instruction to the second screen device, so that the auxiliary device displays the processed content. The following describes a subsequent control process with reference to operations S708 to 5518 by using an example in which the first control signal is used to open the to-be-displayed content.

Operation S708: The first screen device divides the to-be-displayed content into a first part and a second part based on the first control signal.

Operation S709: The first screen device sends the first control instruction to the second screen device. The first control instruction includes the second part of the to-be-displayed content.

In operation S709, the host of the first screen device sends the first control instruction to the second screen device through the Bluetooth short-range module. Correspondingly, a Bluetooth short-range module of the second screen device receives the first control instruction.

Operation S710: The first screen device displays the first part of the to-be-displayed content.

Operation S711: The second screen device displays the second part of the to-be-displayed content.

For example, the user operates the second Bluetooth device to select an image. The second Bluetooth device sends, to the first screen device in response to the click-to-play operation on a button, a control signal used to instruct to play the image. The first screen device sends, to the second screen device, a control instruction used to instruct to display a second part of the image. The first screen device displays a first part of the image on a first interface. The second screen device displays the second part of the image on a second interface.

The foregoing example shown in FIG. 7 is described by using an example in which the user operates the second Bluetooth device to control the first screen group. In some other embodiments, because the first screen device establishes the Bluetooth connections respectively to the first Bluetooth device and the second Bluetooth device, the user may also operate the first Bluetooth device to control the first screen device. In other words, operation S706 may be replaced with a case in which the first Bluetooth device detects the button operation of the user; and operation S707 may be replaced with a case in which the first Bluetooth device sends the first control signal to the first screen device. Subsequent operations are the same as operations S708 to S711. Details are not described herein again. In this way, when the user wants to display content by using the first screen group formed by the first screen device and the second screen device, the user can also pick up the first Bluetooth device to control the primary control device, so that another auxiliary screen in the entire first screen group is controlled by using the primary control device.

In operation S702, the first screen device and the second screen device automatically negotiate the primary control device. The user is unaware of the negotiation process. In other words, the user does not know which screen device in the first screen group is the primary control device. In this embodiment of this application, all auxiliary devices break connections to Bluetooth devices paired with the auxiliary devices. Then, the primary control device establishes Bluetooth connections respectively to all the Bluetooth devices corresponding to the first screen group. In this way, all the Bluetooth devices corresponding to the first screen group can control the primary control device. When the first screen group needs to be controlled, the Bluetooth device matching the primary control device does not need to be found. Therefore, even if the user does not know which screen device is the primary control device, the user can randomly pick up any Bluetooth device to control the primary control device, thereby controlling the first screen group.

In this embodiment of this application, there are a plurality of manners of determining the primary control device of the first screen group. In the foregoing embodiment, a manner in which the first screen device and the second screen device automatically negotiate the primary control device is used as an example for description. In some other embodiments, before the first screen device and the second screen device form the first screen group, the user may set the independent first screen device to the primary control device. In this case, when the first screen device forms a screen group with any other screen device, the first screen device determines, based on configuration information stored in the first screen device, that the configuration information includes an identifier of the primary control device, and then may notify another screen device that the first screen device is the primary control device. For example, in a process in which the first screen device and the second screen device form the first screen group, the first screen device is determined as the primary control device, and the Bluetooth device paired with the first screen device may be directly operated to control the first screen group.

In the example shown in FIG. 7, an example in which two screen devices form the first screen group is used for description. In some other embodiments, more screen devices may discover each other to form one screen group. For example, when at least three screen devices are spliced into a second screen group for use, after a primary control device in the screen group is determined, another auxiliary device breaks a Bluetooth connection to a Bluetooth device paired with the auxiliary device. Then, in the second screen group, based on information about shared Bluetooth devices, connections between the primary control device in the second screen group and the shared Bluetooth devices are dynamically switched. To be specific, the primary control device in the second screen group establishes Bluetooth connections to Bluetooth devices paired with all auxiliary devices. In this way, the user can operate any Bluetooth device corresponding to the second screen group, to control the primary control device and further control another auxiliary device by using the primary control device.

In some other embodiments, the second Bluetooth device detects a button operation of the user, and sends a second control signal to the first screen device. The second control signal is used for a control operation on each screen device in the first screen group, for example, an operation such as volume adjustment, brightness adjustment, video source switching, and fast forwarding. After receiving the second control signal, the Bluetooth short-range module of the first screen device sends the first control signal to the host of the first screen device. The host of the first screen device generates, based on the first control signal, a second control instruction corresponding to the second control signal, and then sends, to the auxiliary screen by using the Bluetooth short-range module, the second control instruction corresponding to the second control signal, so that the auxiliary screen performs a corresponding operation. The following describes a subsequent control process with reference to FIG. 8 by using an example in which the first control signal is used to adjust volume.

Figure 8:
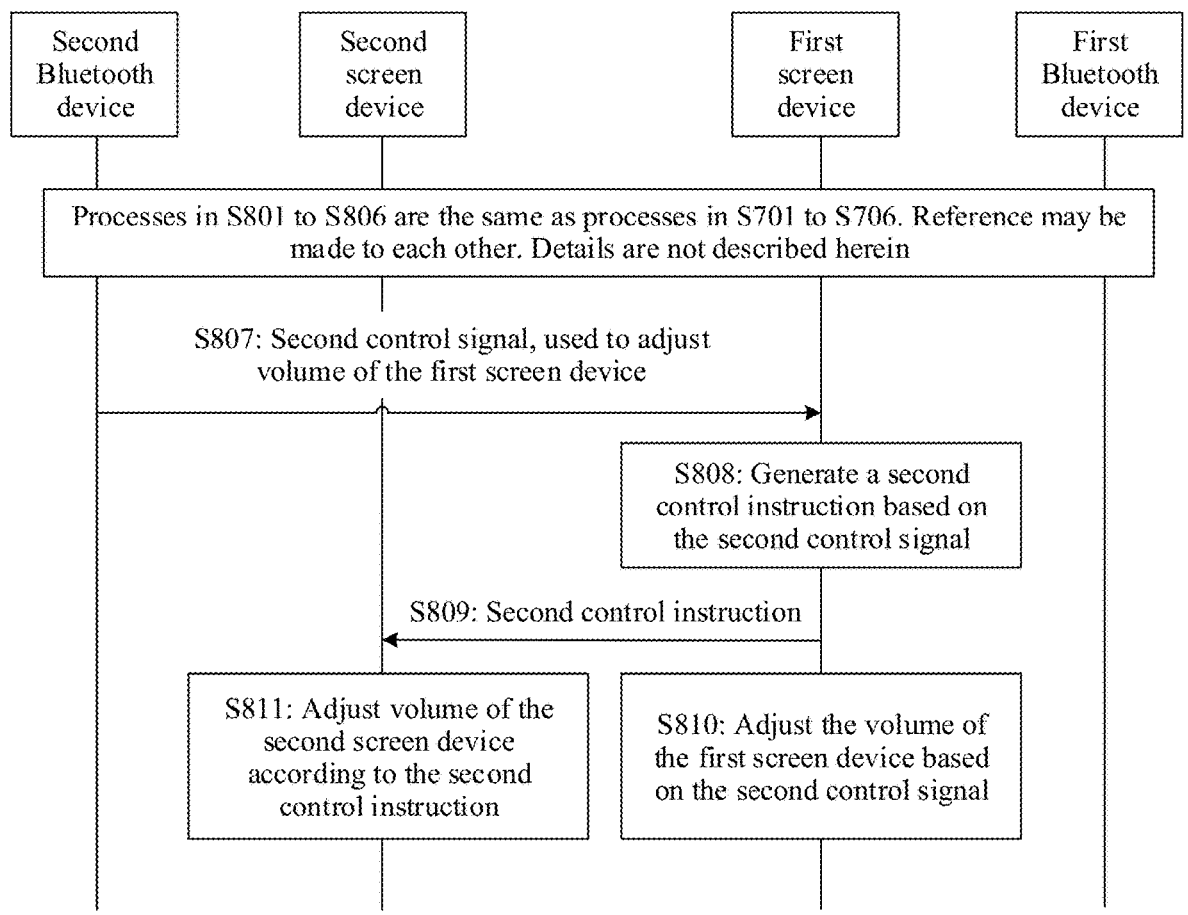
FIG. 8 is a third flowchart of a method for controlling a plurality of screen devices according to an embodiment of this application.

FIG. 8 is a third flowchart of a method for controlling a plurality of screen devices according to an embodiment of this application. The example shown in FIG. 8 may be applied in the scenario shown in FIG. 4. In the example shown in FIG. 8, a first screen device may be the screen B, and a second screen device may be the screen C. Specifically, a specific procedure of this example may include the following operations.

Processes in operations S801 to S806 are the same as the processes in operations S701 to S706. Details are not described herein again.

Operation S807: The second Bluetooth device sends a second control signal to the first screen device. The second control signal is used to adjust volume of the first screen device.

Operation S808: The first screen device generates a second control instruction based on the second control signal.

Operation S809: The first screen device sends the second control instruction to the second screen device. The second control instruction is used to instruct the second screen device to adjust volume.

In operation S809, a host of the first screen device sends the second control instruction to the second screen device through a Bluetooth short-range module. Correspondingly, a Bluetooth short-range module of the second screen device receives the second control instruction.

Operation S810: The first screen device adjusts the volume of the first screen device based on the second control signal.

Operation S811: The second screen device adjusts the volume of the second screen device according to the second control instruction.

Figure 9:
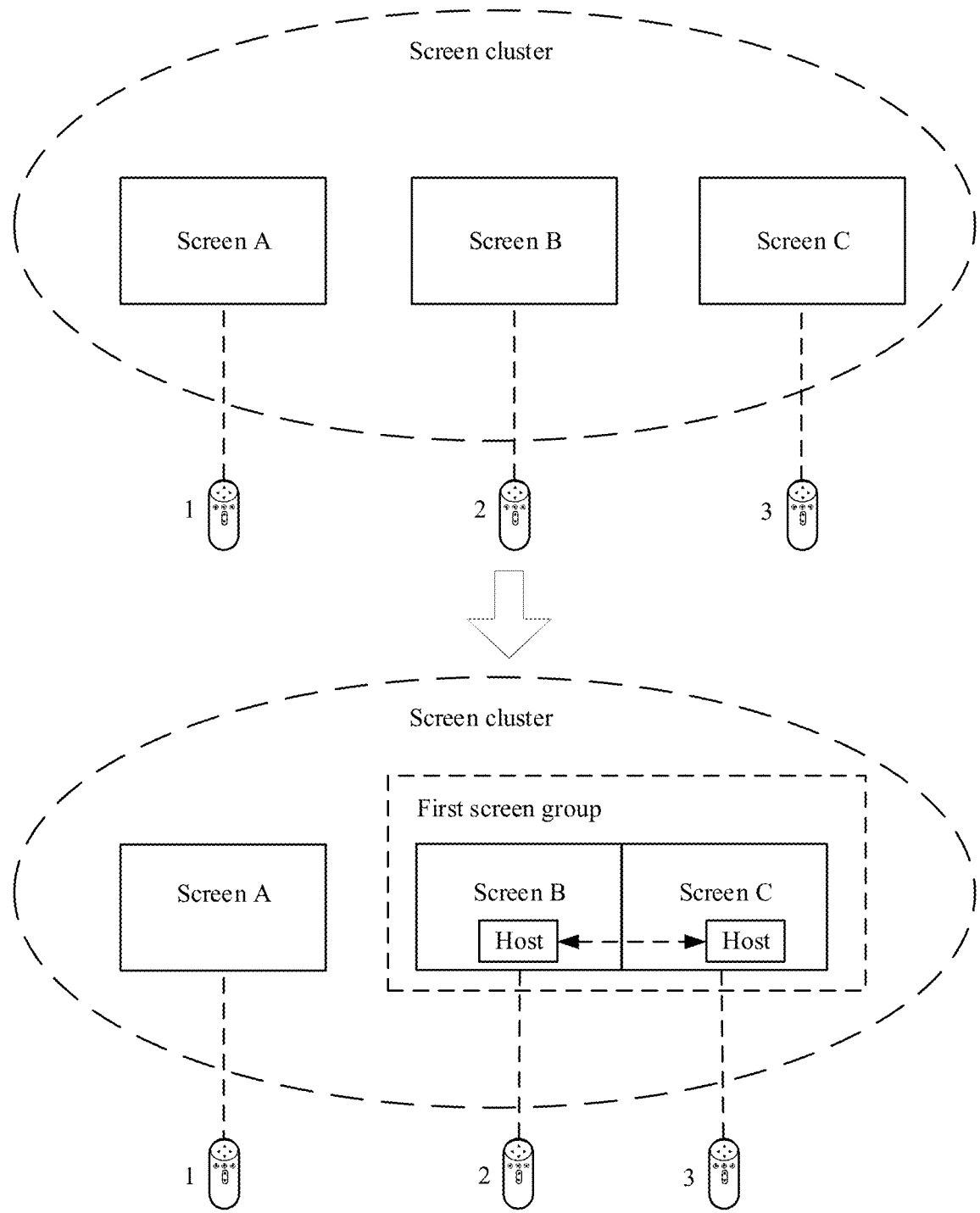
FIG. 9 is a schematic diagram of another example scenario to which a method for controlling a plurality of screen devices is applicable according to an embodiment of this application.

For another example, FIG. 9 is a schematic diagram of another example scenario to which a method for controlling a plurality of screen devices is applicable according to an embodiment of this application. In FIG. 9, a screen A, a screen B, and a screen C in a same screen cluster are respectively connected to paired Bluetooth devices. The screen A is connected to a Bluetooth device 1, the screen B is connected to a Bluetooth device 2, and the screen C is connected to a Bluetooth device 3. Different from the scenario shown in FIG. 4, after the screen B and the screen C form a first screen group, a pairing relationship between each screen in the first screen group and a paired Bluetooth device is not changed. In other words, a Bluetooth connection between the screen B and the Bluetooth device 2 is still maintained, and a Bluetooth connection between the screen C and the Bluetooth device 3 is maintained. A control signal of the Bluetooth device 2 is directly input to a host of the primary control device B, and is converted into input for controlling a first screen group system. A control signal of the Bluetooth device 3 is first input to a host of the screen C. The host of the screen C converts the received control signal into a control instruction, and sends the control instruction to the host of the primary control device B through a network, to control the first screen group system.

Figure 10:
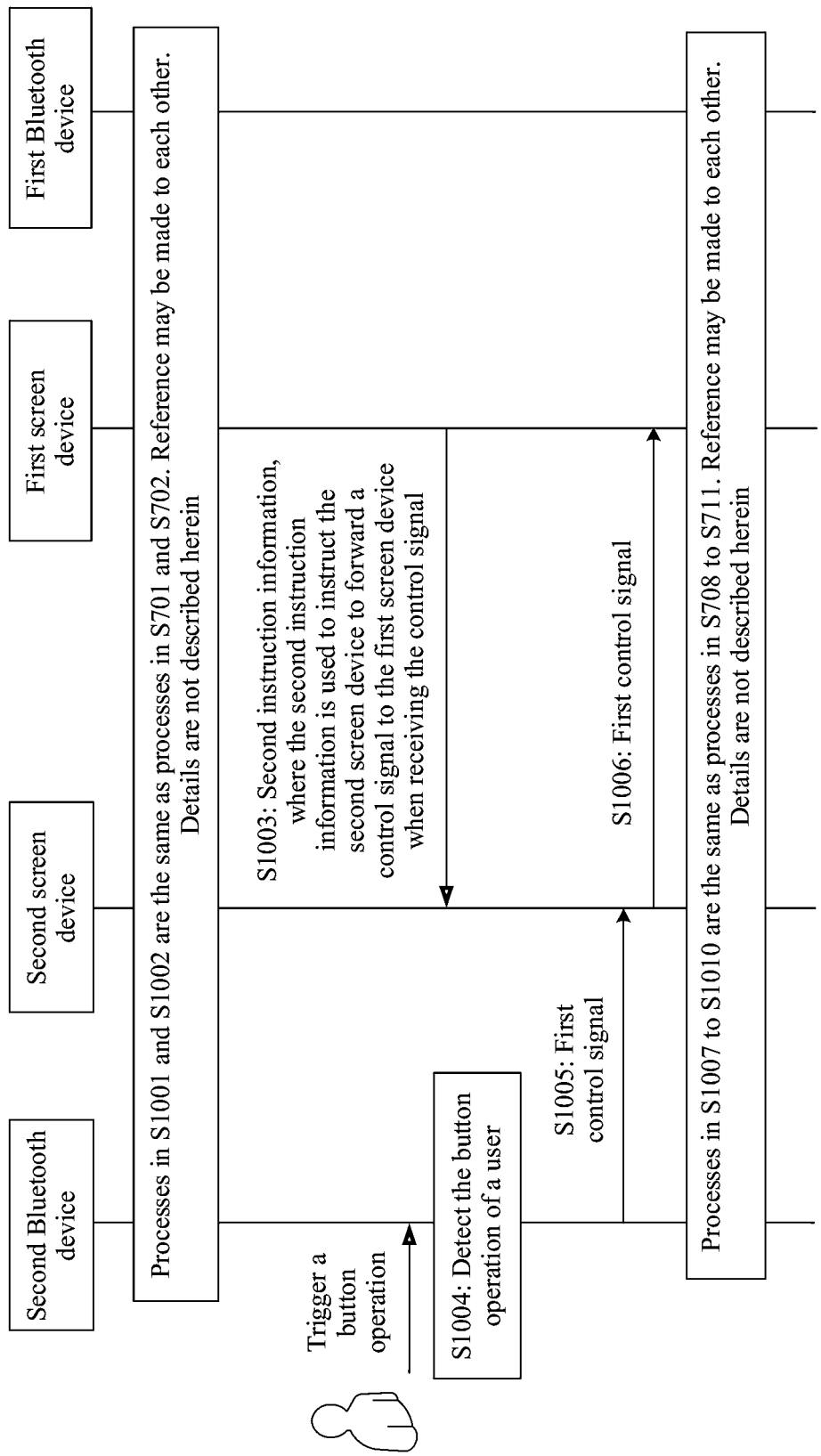
FIG. 10 is a fourth flowchart of a method for controlling a plurality of screen devices according to an embodiment of this application.

Based on the foregoing content, FIG. 10 is a fourth flowchart of a method for controlling a plurality of screen devices according to an embodiment of this application. The example shown in FIG. 10 may be applied in the scenario shown in FIG. 9. In the example shown in FIG. 10, a first screen device may be the screen B, a second screen device may be the screen C, and a third screen device may be the screen A. Specifically, a specific procedure of this example may include the following operations.

Processes in operations S1001 and S1002 are the same as the processes in operations S701 and S702. Details are not described herein again.

Operation S1003: The first screen device sends second instruction information to the second screen device. The second instruction information is used to instruct the second screen device to forward a control signal to the first screen device when receiving the control signal.

Operation S1004: The second Bluetooth device detects a button operation of a user.

Operation S1005: The second Bluetooth device sends a first control signal to the second screen device. The first control signal is used to indicate to open to-be-played content.

Operation S1006: The second screen device sends a first control signal to the first screen device.

After operation S1006, processes in operations S1007 to S1010 are the same as the processes in operations S708 to S711. Details are not described herein again.

In some other embodiments, if the first control signal is used to adjust volume, processes in operations S1007 to S1010 are the same as the processes in operations S808 to S811. Details are not described herein again.

In this embodiment, after the first screen device and the second screen device form a first screen group, a Bluetooth connection between each auxiliary device and a paired Bluetooth device is continuously maintained, and the primary control device does not establish a connection to the paired Bluetooth device of the auxiliary device either. In other words, each screen device in the first screen group continues to maintain a Bluetooth connection to an original paired Bluetooth device. After receiving a control signal, the auxiliary screen forwards the control signal to the primary control device through a network connection. The host of the primary control device receives input of button down/up events and key values of the Bluetooth devices that are forwarded by hosts of all the auxiliary screens, to uniformly control an interface of a screen group system.

In this example, the user may operate the Bluetooth device paired with the primary control device, to control the primary control device. Alternatively, the user may operate the Bluetooth device paired with the auxiliary device, to control the auxiliary device. Then, the auxiliary device sends a control instruction to the primary control device through an internal network of the first screen group system, to control the primary control device. In this way, the first screen group can be controlled through only the first screen group system by using any remote control without an additional hardware device or module.

Figure 11:
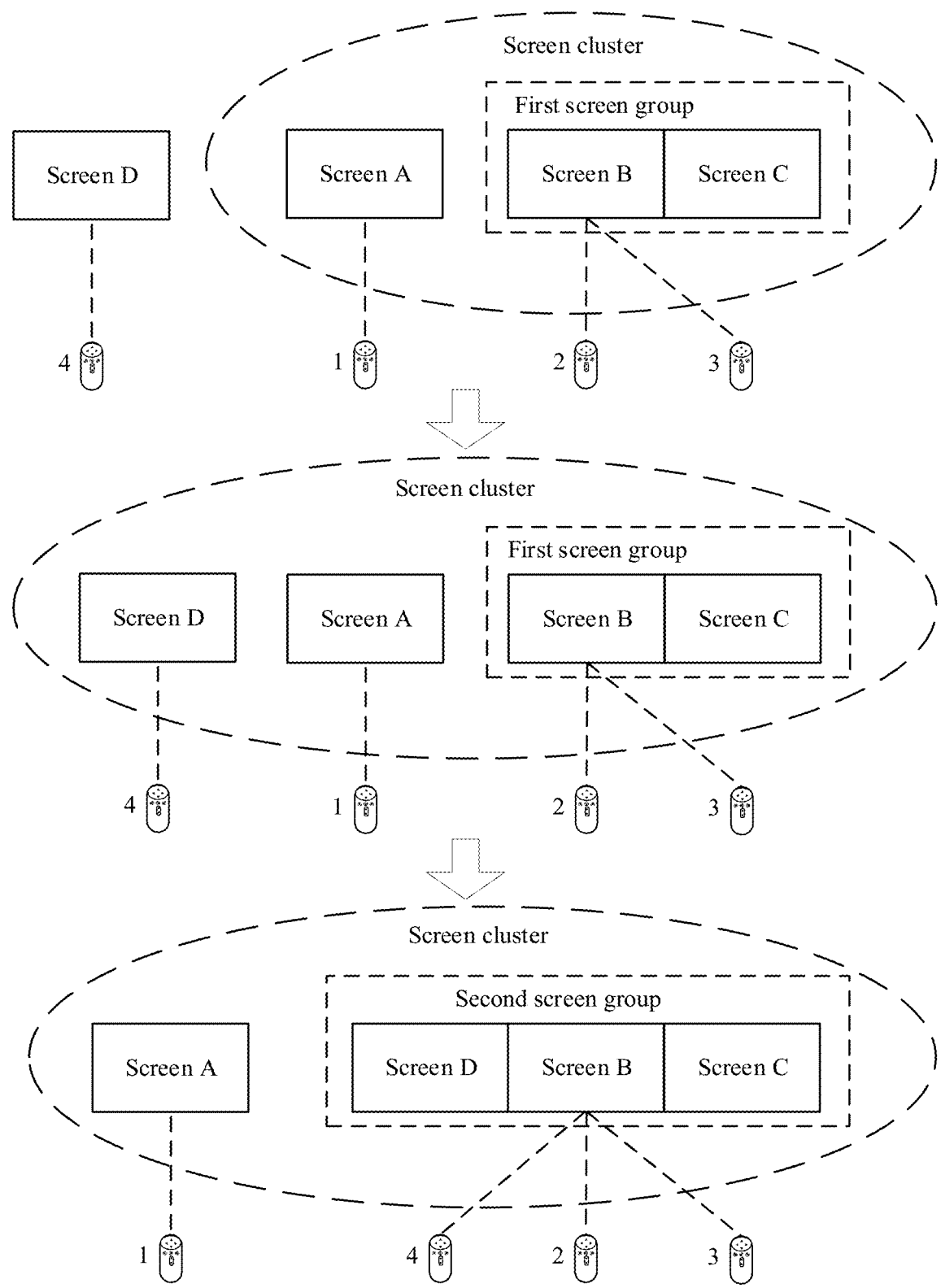
FIG. 11 is a schematic diagram of still another example scenario to which a method for controlling a plurality of screen devices is applicable according to an embodiment of this application.

Scenario 2: In a use process of a first screen group including a first screen device and a second screen device, if a user wants to use a larger screen, a third screen device may be newly added to the first screen group. Based on the scenario shown in FIG. 4, FIG. 11 is a schematic diagram of still another example scenario to which a method for controlling a plurality of screen devices is applicable according to an embodiment of this application. In FIG. 11, a screen cluster includes a screen A, a screen B, and a screen C. The screen B and the screen C form a first screen group. The screen A is connected to a Bluetooth device 1, and the screen B is connected to a Bluetooth device 2 and a Bluetooth device 3. A screen D is newly added to the screen cluster. The screen D is connected to a Bluetooth device 4.

When the user moves the screen D nearby the first screen group and splices the screen D and the first screen group into one larger combined screen for use, the first screen group and the screen D form a second screen group. The screen devices included in the second screen group may negotiate with each other to determine one screen as a primary control device of the second screen group, and other screens as auxiliary screens. For a negotiation manner of the primary control device of the second screen group, refer to the foregoing negotiation manner of the primary control device of the first screen group. Details are not described herein again.

After the primary control device of the second screen group is determined, the primary control device may update a control information table based on a MAC address of a remote control corresponding to the screen D, that is, MAC 4, a pairing mapping relationship between the screen D and the Bluetooth remote control: Screen D: MAC 4, and a connection mapping relationship of the screen group: B: 2&3&4. Specifically, the primary control device (the screen D) may update the control information table of the screen cluster shown in Table 2 to Table 3.

TABLE 3

| Screen cluster | Screen list (ScreenList) | Screen A, Screen B, Screen C, Screen D |
|---|---|---|
| | Screen group list (JointList) | Screen B (primary), Screen C, Screen D |
| | MAC list of Bluetooth remote controls (RcuMacList) | MAC 1, MAC 2, MAC 3, MAC 4 |
| | Map list between a remote control and a screen (RcuScreenMap) | Screen A: MAC 1, Screen B: MAC 2, Screen C: MAC 3, Screen D: MAC 4 |
| | Connection map list (ConnectMap) | A: 1, B: 2&3&4 |

Then, the primary control device (the screen D) synchronously stores Table 3 in a screen group system, that is, stores Table 3 in each screen device in the second screen group in a distributed manner.

Figure 12A:
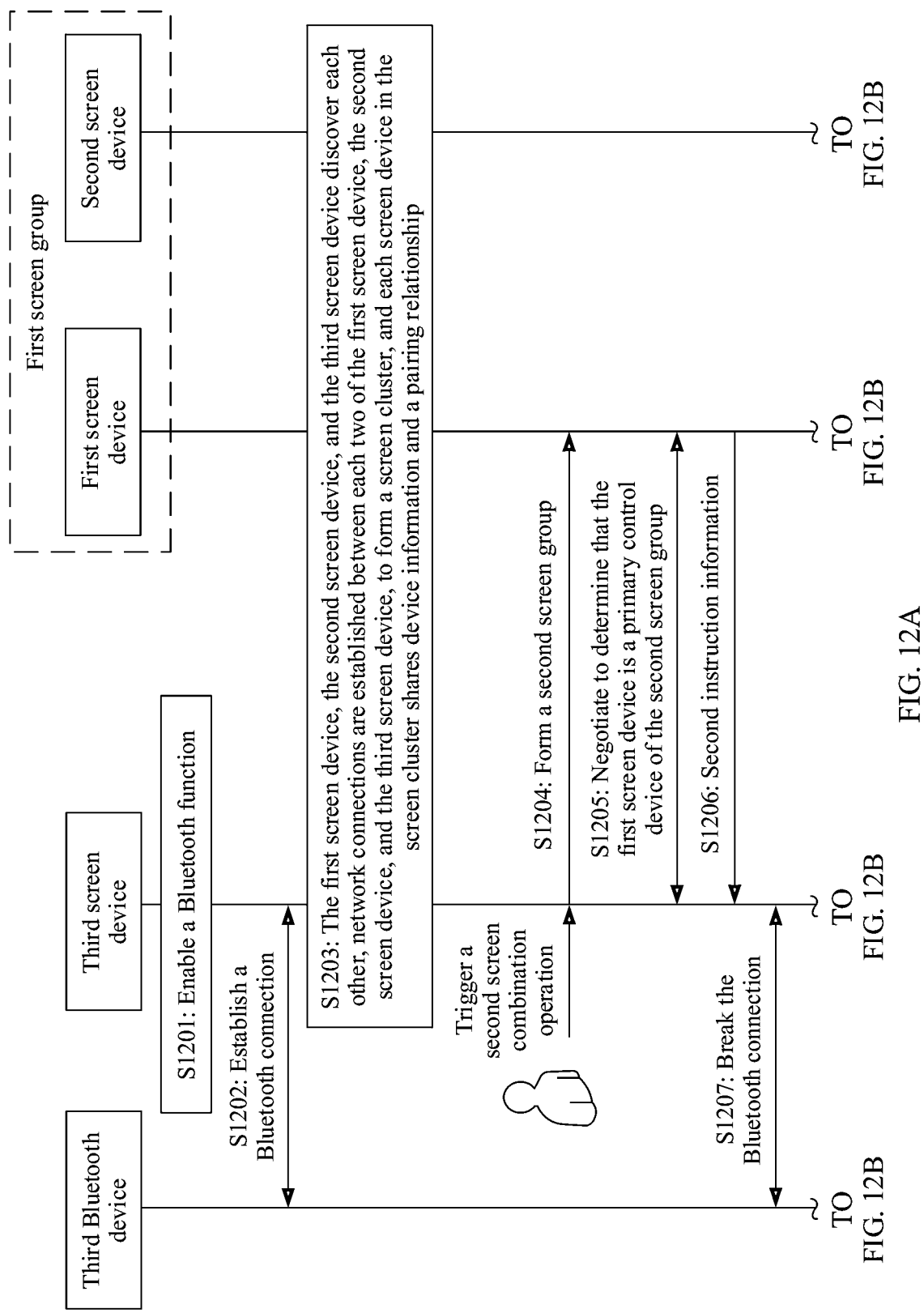
FIG. 12A and FIG. 12B are a fifth flowchart of a method for controlling a plurality of screen devices according to an embodiment of this application.
Figure 12B:
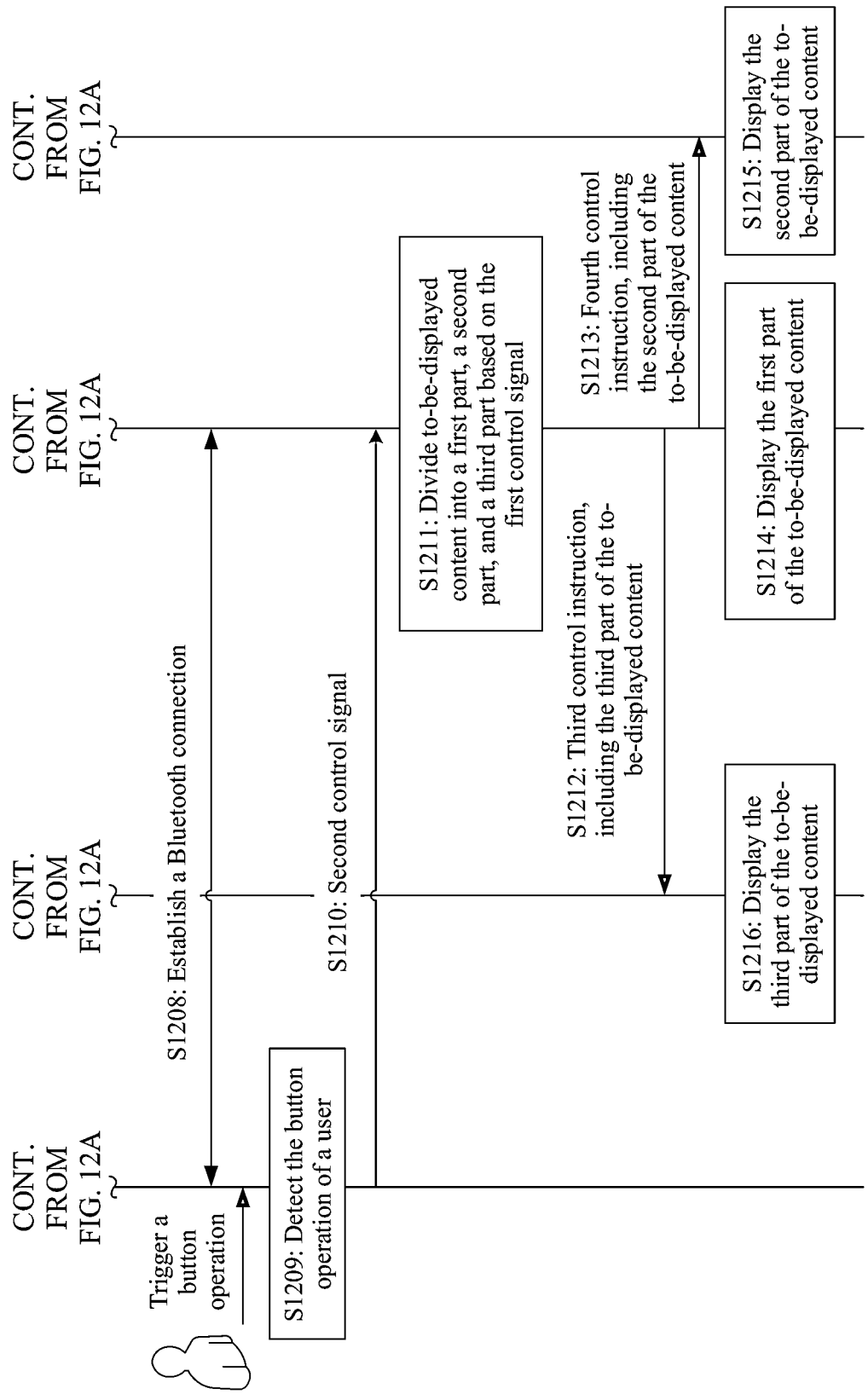

Based on the foregoing content, FIG. 12A and FIG. 12B are a fifth flowchart of a method for controlling a plurality of screen devices according to an embodiment of this application. The example shown in FIG. 12A and FIG. 12B may be applied in the scenario shown in FIG. 11. In the example shown in FIG. 11, a first screen device may be the screen B, a second screen device may be the screen C, and a third screen device may be the screen D. Specifically, a specific procedure of this example may include the following operations.

Operation S1201: The third screen device enables a Bluetooth function.

Operation S1202: The third screen device establishes a Bluetooth connection to a matching third Bluetooth device.

Operation S1203: The first screen device, the second screen device, and the third screen device discover each other. Network connections are established between each two of the first screen device, the second screen device, and the third screen device, to form a screen cluster. Each screen device in the screen cluster shares device information and a pairing relationship.

The device information includes information about the screen device and information about a Bluetooth device paired with the screen device. The pairing relationship includes a pairing relationship between the screen device and the Bluetooth device.

The screen cluster includes a first screen group. The first screen group includes the first screen device and the second screen device.

After receiving an identifier of the third screen device, an identifier of the third Bluetooth device, and a pairing relationship between the third screen device and the third Bluetooth device, the first screen device may add the identifier of the third screen device, the identifier of the third Bluetooth device, and the pairing relationship between the third screen device and the third Bluetooth device to a MAC list of Bluetooth remote controls of the screen group, so that the primary control device is connected to and paired with the Bluetooth device paired with the newly added third screen device.

Operation S1204: The third screen device detects a second screen combination operation, and forms a second screen group with the third screen device in response to the second screen combination operation.

Operation S1205: The screen devices in the second screen group negotiate to determine that the first screen device is a primary control device of the second screen group.

Operation S1206: The first screen device sends second instruction information to the third screen device. The second instruction information is used to instruct the third screen device to break a Bluetooth connection to the third Bluetooth device.

Operation S1207: The third screen device breaks the Bluetooth connection to the third Bluetooth device.

Operation S1208: The first screen device establishes a Bluetooth connection to the third Bluetooth device.

After the first screen device establishes the Bluetooth connection to the third Bluetooth device, the first screen device has established Bluetooth connections respectively to a first Bluetooth device, a second Bluetooth device, and the third Bluetooth device. A user may operate any one of the first Bluetooth device, the second Bluetooth device, and the third Bluetooth device to control the primary control device, that is, control the first screen device, thereby controlling the second screen group.

The following describes a subsequent control process by using an example of operating the third Bluetooth device.

Operation S1209: The third Bluetooth device detects a button operation of the user.

Operation S1210: The third Bluetooth device sends a second control signal to the first screen device.

Operation S1211: The first screen device divides to-be-displayed content into a first part, a second part, and a third part based on the first control signal.

Operation S1212: The first screen device sends a third control instruction to the third screen device.

Operation S1213: The first screen device sends a fourth control instruction to the second screen device.

Operation S1214: The first screen device displays the first part of the to-be-displayed content.

Operation S1215: The second screen device displays the second part of the to-be-displayed content.

Operation S1216: The third screen device displays the third part of the to-be-displayed content.

It should be noted that processes in operations S1201 to S1216 are similar to the processes in operations S501 to S507 and operations S701 to S711. For brevity, the specific processes in operations S1201 to S1216 are not shown in FIG. 12A and FIG. 12B one by one. FIG. 12A and FIG. 12B merely summarize examples. For details, refer to examples of operations S501 to S507 and operations S701 to S711.

Scenario 3: In a use process of a second screen group including a first screen device, a second screen device, and a third screen device, a user may also split the screen devices in the second screen group, so that one or more of the screen devices are independently used.

The following describes a scenario of removing a screen device.

Figure 13A:
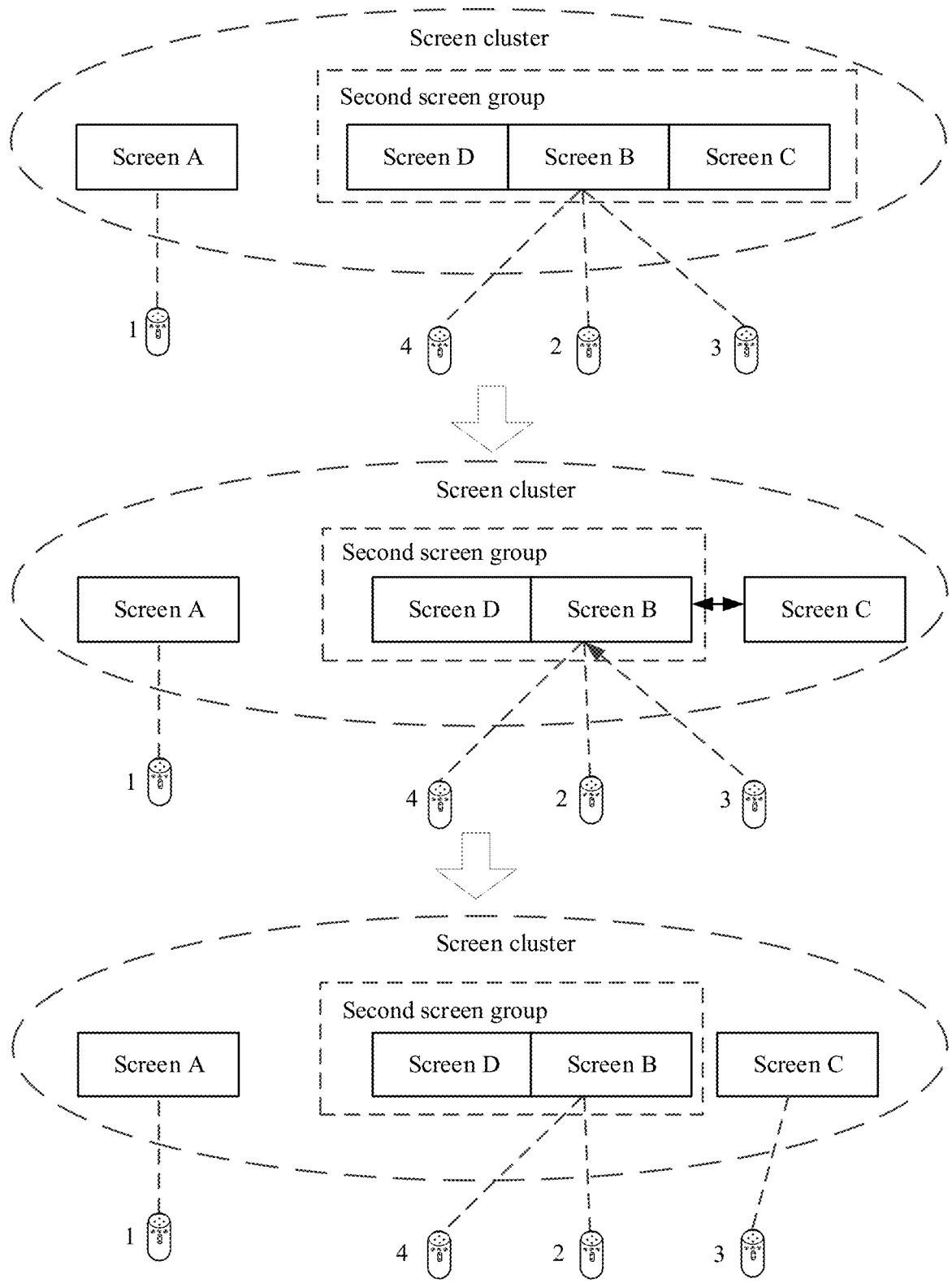
FIG. 13A is a schematic diagram of still another example scenario to which a method for controlling a plurality of screen devices is applicable according to an embodiment of this application.

FIG. 13A is a schematic diagram of still another example scenario to which a method for controlling a plurality of screen devices is applicable according to an embodiment of this application. As shown in FIG. 13A, a screen A, a screen B, a screen C, and a screen D are in a same screen cluster. The screen A is an independent screen. In a second screen group formed by the screen B, the screen D, and the screen C, the screen B is a primary control device, and the screen B establishes Bluetooth connections respectively to a Bluetooth remote control 2, a Bluetooth remote control 3, and a Bluetooth remote control 4.

If an auxiliary device is to be removed, for example, as shown in FIG. 13A, the screen C is to be removed, the screen B detects a screen removal operation for the screen C, and sends a screen removal instruction to the screen C, to instruct to remove the screen C. A user can hold any one of a Bluetooth remote control 2, a Bluetooth remote control 3, and a Bluetooth remote control 4 to control removal of the screen C. An example in which the user operates the Bluetooth remote control 3 is used. The Bluetooth remote control 3 detects a button operation of the user, and sends a control signal to the screen B. After receiving the control signal, the screen B sends instruction information to the screen C. The instruction information is used to instruct the screen C to establish a connection to the Bluetooth remote control 3. At the same time, the screen B breaks a connection to the Bluetooth remote control 3.

In some other embodiments, if the primary control device is to be removed, that is, the screen B, when the user holds any one of the Bluetooth remote control 2, the Bluetooth remote control 3, and the Bluetooth remote control 4 to perform an operation, for example, the user presses a button of the Bluetooth remote control 2, the screen B receives a control signal of the Bluetooth remote control 2, and the screen B is directly bound to the Bluetooth remote control 2 and breaks connections to the Bluetooth remote control 3 and the Bluetooth remote control 4, so that the Bluetooth device held by the user can directly control removal of the primary control device. The remaining screen C in the second screen group renegotiates with the screen D to determine a primary control screen. For a subsequent process, refer to operation 702 to operation 711.

The following describes a scenario of removing a plurality of screen devices. An example of removing two screen devices is used for description.

Figure 13B:
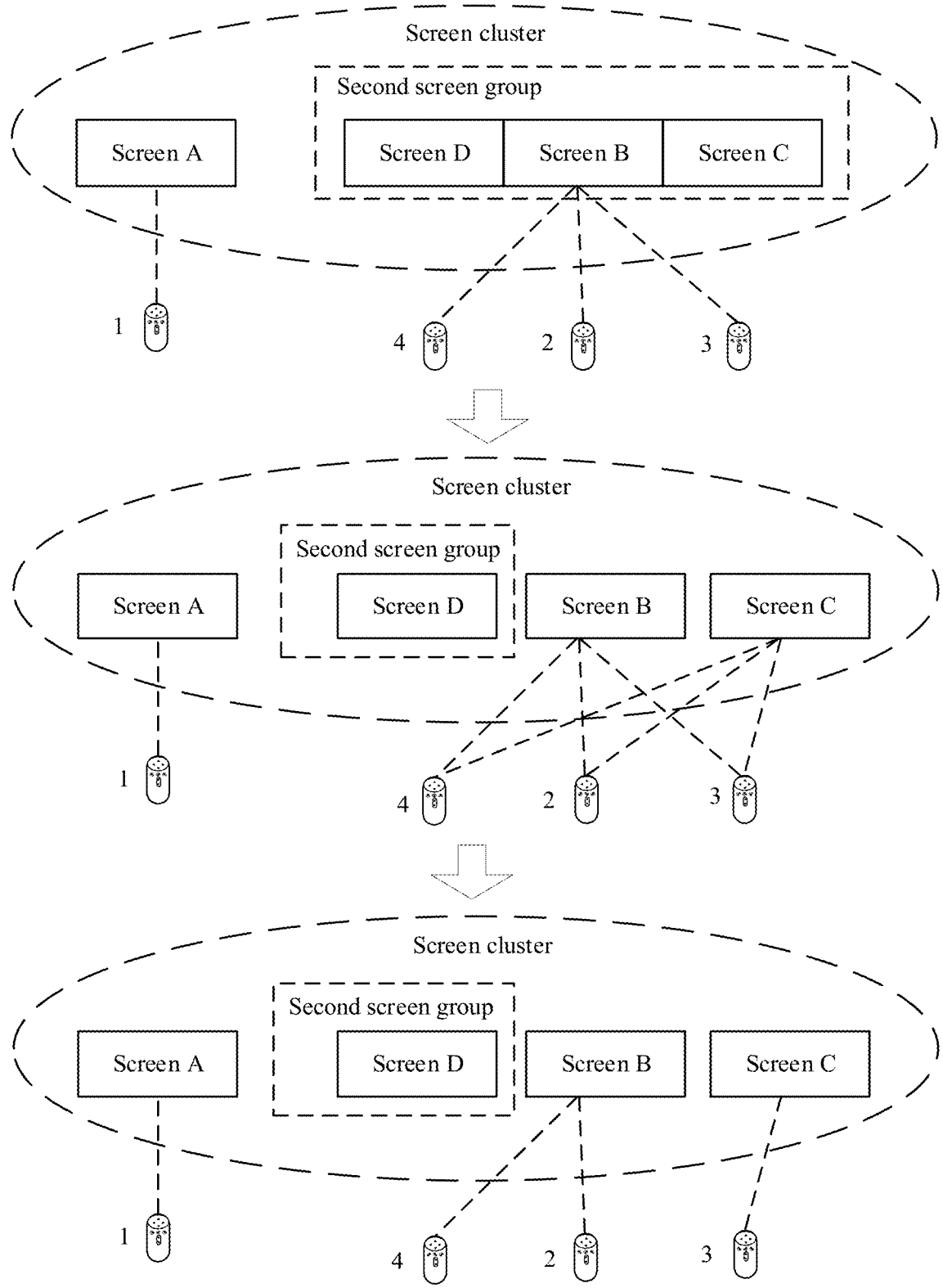
FIG. 13B is a schematic diagram of still another example scenario to which a method for controlling a plurality of screen devices is applicable according to an embodiment of this application.

FIG. 13B is a schematic diagram of still another example scenario to which a method for controlling a plurality of screen devices is applicable according to an embodiment of this application. As shown in FIG. 13B, a screen A, a screen B, a screen C, and a screen D are in a same screen cluster. The screen A is an independent screen. In a second screen group formed by the screen B, the screen D, and the screen C, the screen B is a primary control device, and the screen B establishes Bluetooth connections respectively to a Bluetooth remote control 2, a Bluetooth remote control 3, and a Bluetooth remote control 4.

If two to-be-removed screen devices include one primary control device and one auxiliary device, for example, the screen B and the screen C are to be removed, the screen B detects a screen removal operation for the screen B and the screen C, and the screen B sends a screen removal instruction to the screen C, to instruct to remove the screen C.

Figure 13C:
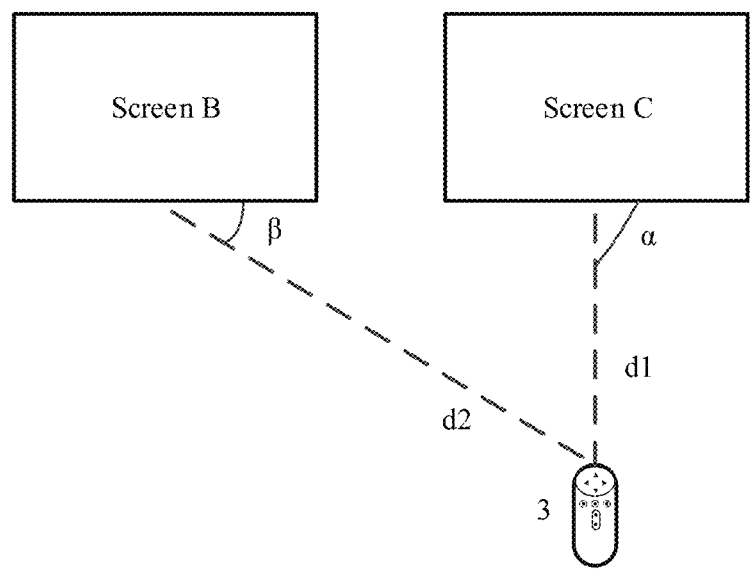
FIG. 13C is a schematic diagram of controlling a removal scenario according to an embodiment of this application.

The screen C establishes Bluetooth connections to all the Bluetooth remote controls (that is, the Bluetooth remote control 2, the Bluetooth remote control 3, and the Bluetooth remote control 4) corresponding to the screen group. When a user holds any one of the Bluetooth remote control 2, the Bluetooth remote control 3, and the Bluetooth remote control 4 to perform an operation, for example, the Bluetooth remote control 3 receives an operation of the user, the Bluetooth remote control 3 sends control signals respectively to the screen B and the screen C in response to the operation of the user. As shown in FIG. 13C, the screen B determines a distance d2 between the screen B and the Bluetooth remote control 3 and an arrival angle β of the signal based on the received control signal. The distance d2 may be determined based on signal strength that is of the control signal sent by the Bluetooth remote control 3 and that is detected by the screen B. For a manner of determining the arrival angle β, refer to an angle measurement principle shown in FIG. 16 below. The screen C determines a distance d1 between the screen C and the Bluetooth remote control 3 and an arrival angle α of the signal based on the received control signal. The distance d1 may be determined based on signal strength that is of the control signal sent by the Bluetooth remote control 3 and that is detected by the screen C. For a manner of determining the arrival angle α, refer to an angle measurement principle shown in FIG. 16 below. If a screen group system determines that ∠α>∠β and d1<d2, the screen group system determines that a target screen controlled by using the Bluetooth remote control 3 is the screen C, and then the screen group system controls the screen C to prompt a request for binding the Bluetooth remote control 3. As shown in FIG. 13C, the user may operate the Bluetooth remote control 3 to select Yes, to determine a binding relationship. The screen C breaks Bluetooth connections to the Bluetooth remote control 2 and the Bluetooth remote control 4, so that the screen C can be controlled through holding the Bluetooth remote control 3. The screen B continuously keeps connections to the Bluetooth remote control 2 and the Bluetooth remote control 4, and breaks a connection to the Bluetooth remote control 3. The user may control the screen B by using either of the Bluetooth remote control 2 and the Bluetooth remote control 4, to control the to-be-removed screen B. For a specific implementation, refer to the related description of the scenario of removing the primary control device.

If the two to-be-removed screen devices are both auxiliary devices, for example, the screen C and the screen D are to be removed, the screen C and the screen D are separately connected to the Bluetooth remote control 2, the Bluetooth remote control 3, and the Bluetooth remote control 4, and the user holds any one of the Bluetooth remote control 2, the Bluetooth remote control 3, and the Bluetooth remote control 4 to control removal of the screen C or D. This is not described herein.

The following describes a screen control process in the scenario in FIG. 13B with reference to a specific example.

Figures 1, 13D:
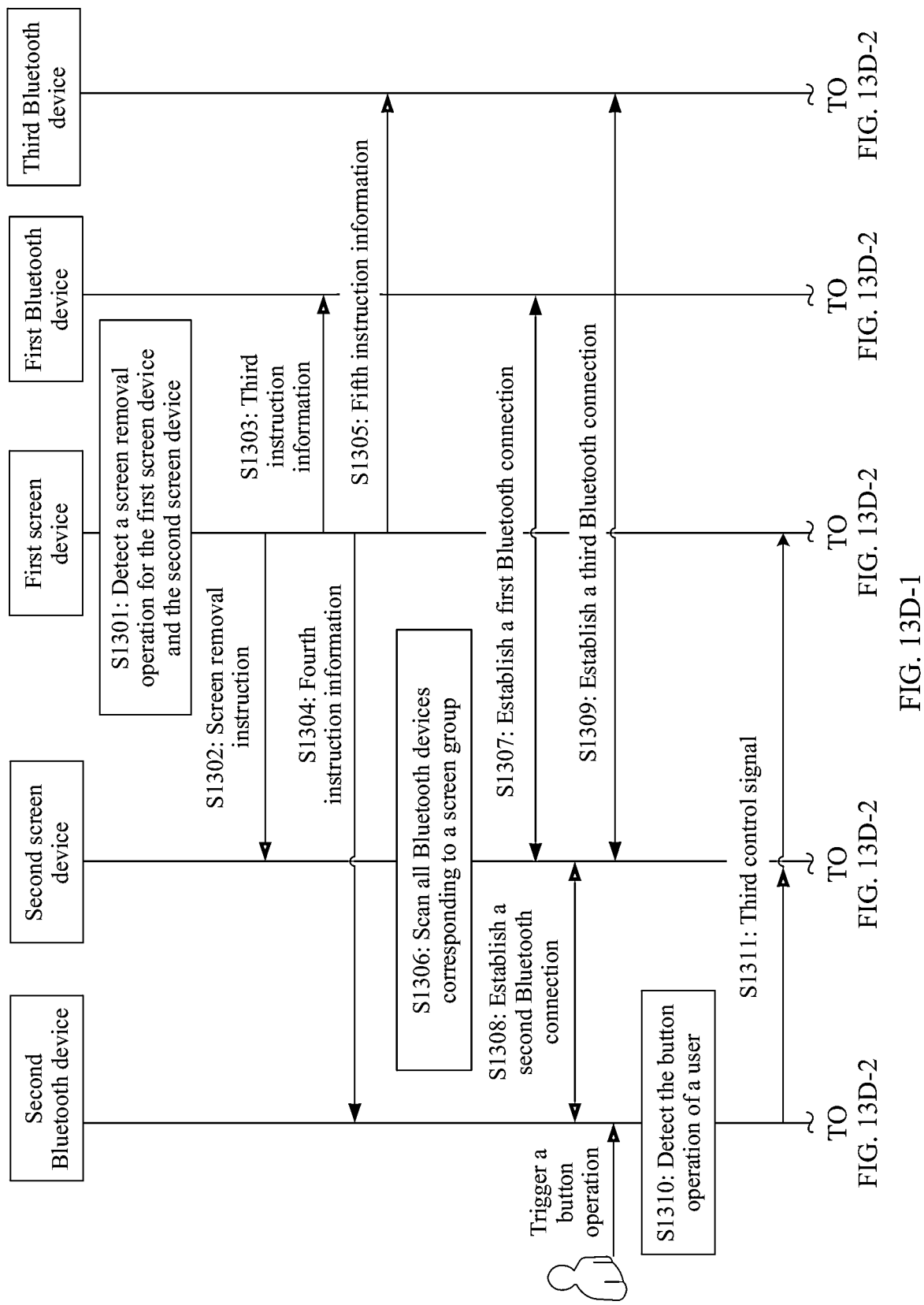

Based on the foregoing content, FIG. 13D-1 and FIG. 13D-2 are a sixth flowchart of a method for controlling a plurality of screen devices according to an embodiment of this application. The example shown in FIG. 13D-1 and FIG. 13D-2 may be applied in the scenario shown in FIG. 13A.

In the example shown in FIG. 13D-1 and FIG. 13D-2, a first screen device may be the screen B, a second screen device may be the screen C, and a third screen device may be the screen D. Specifically, a specific procedure of this example may include the following operations.

Operation S1301: The first screen device detects a screen removal operation for the first screen device and the second screen device.

In an embodiment, the screen removal operation may be actively detected by the first screen device. For example, the first screen device detects the screen removal operation when a detected distance between the first screen device and another screen device in a screen group is greater than a specific threshold. In this implementation, the primary control device may detect a distance to each auxiliary screen; and each screen device in a screen group may determine, by using a sensor of the screen device, whether the screen device is moved, and share information with another screen device in the screen group, to determine a specific screen device to be removed. In an example, the second screen device is moved, and a change amount of a distance between the second screen device and another screen device that is not moved is greater than a threshold. In this case, it is determined that the second screen device needs to be removed.

In another implementation, the user actively sends a screen removal operation. For example, a button operation from the first Bluetooth device or the second Bluetooth device is received. The button operation is used to trigger removal of the second screen device.

Operation S1302: The first screen device sends a screen removal instruction to the second screen device in response to the screen removal operation.

In this embodiment of this application, after the second screen device is removed from the screen group, the first screen device and the second screen device are not in the same screen group but are still in a same screen cluster, and may still send information to each other.

Operation S1303: The first screen device sends third instruction information to the first Bluetooth device. The third instruction information is used to instruct the first Bluetooth device to enter a scanning and receiving state.

It should be noted that operation S1303 is an optional operation. After establishing a Bluetooth connection to the first screen device, the first Bluetooth device may enter a low power consumption state. The low power consumption state may be understood as a state in which a message can be received but no response is sent. In this case, if another screen device (for example, the second screen device) sends a connection request to the first Bluetooth device, the first Bluetooth device does not send a connection response. Therefore, the another screen device cannot establish a Bluetooth connection to the first Bluetooth device. In order that the second screen device can also establish a Bluetooth connection to the first Bluetooth device, instruction information used to instruct the first Bluetooth device to enter the scanning and receiving state may be first sent to the first Bluetooth device. In this way, after receiving the connection request sent by the second screen device, the first Bluetooth device may also send a response message, so that the first Bluetooth device can also establish the Bluetooth connection to the second screen device. In some other examples, after establishing the Bluetooth connection to the first screen device, the first Bluetooth device may keep in the scanning and receiving state. In this way, operation S1303 is not needed. When receiving a connection request sent by another screen device, the first Bluetooth device may also send a connection response, to establish a Bluetooth connection to the another screen device.

Operation S1304: The first screen device sends fourth instruction information to the second Bluetooth device. The fourth instruction information is used to instruct the second Bluetooth device to enter a scanning and receiving state.

It should be noted that operation S1304 is an optional operation. For specific description, refer to the description of operation S1303. Details are not described herein.

Operation S1305: The first screen device sends fifth instruction information to the third Bluetooth device. The fifth instruction information is used to instruct the third Bluetooth device to enter a scanning and receiving state.

It should be noted that operation S1305 is an optional operation. For specific description, refer to the description of operation S1303. Details are not described herein.

Operation S1306: The second screen device scans all Bluetooth devices corresponding to a second screen group.

If the second screen device finds the first Bluetooth device through scanning, the second screen device continues to perform operation S1307. If the second screen device finds the second Bluetooth device through scanning, the second screen device continues to perform operation S1308. If the second screen device finds the third Bluetooth device through scanning, the second screen device continues to perform operation S1309.

Operation S1307: The second screen device establishes a first Bluetooth connection to the first Bluetooth device.

Operation S1308: The second screen device establishes a second Bluetooth connection to the second Bluetooth device.

Operation S1309: The second screen device establishes a third Bluetooth connection to the third Bluetooth device.

In this case, the first screen device has established the Bluetooth connections respectively to the first Bluetooth device, the second Bluetooth device, and the third Bluetooth connection; and the second screen device has established the Bluetooth connections respectively to the first Bluetooth device, the second Bluetooth device, and the third Bluetooth connection. The following describes a subsequent control process by using an example of operating the second Bluetooth device.

Operation S1310: The second Bluetooth device detects a button operation.

Operation S1311: The second Bluetooth device separately sends a third control signal to the first screen device and the second screen device in response to the button operation.

Operation S1312: The first screen device determines, based on the received third control signal, a first arrival angle formed by a receive antenna of the first screen device and the second Bluetooth device, and a distance between the first screen device and the second Bluetooth device. The distance may be determined based on signal strength of the third control signal received by the first screen device.

It should be noted that the arrival angle may be an included angle between the second Bluetooth device and the receive antenna of the first screen device. In this embodiment of this application, it is considered that a same arrival angle is formed between each of N receive antennas of the first screen device and the second Bluetooth device.

The following uses an example in which two receive antennas Rx1 and Rx2 of the first screen device separately receive a third control signal of a transmit antenna Tx1 of the second Bluetooth device, to describe a principle of determining the arrival angle formed by the receive antenna of the first screen device and the second Bluetooth device.

Figure 16:
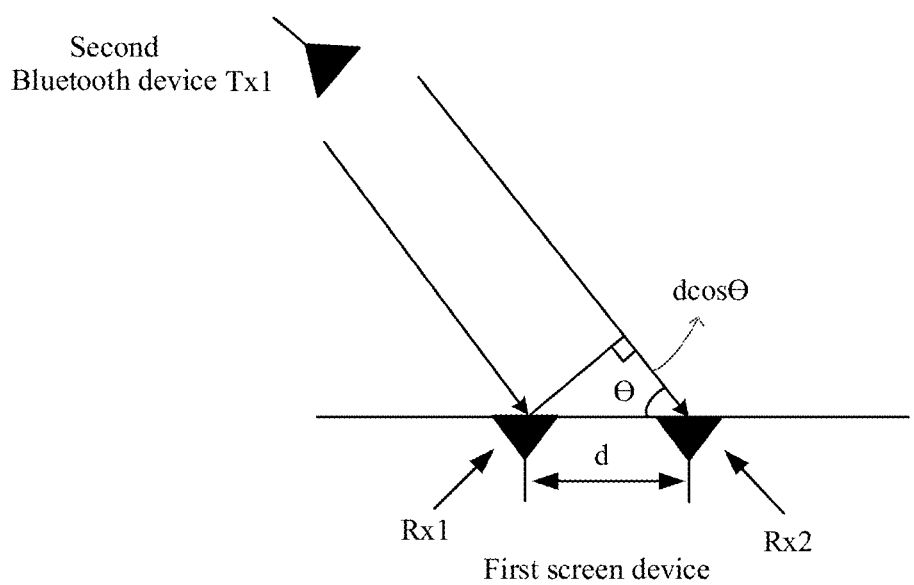
FIG. 16 is a schematic diagram of an angle measurement principle according to an embodiment of this application.

FIG. 16 is a schematic diagram of an angle measurement principle according to an embodiment of this application.

A transmit signal transmitted by the transmit antenna Tx1 of the second Bluetooth device is separately received by the two receive antennas Rx1 and Rx2 of the first screen device. There is a phase difference co between the third control signals respectively received by the two receive antennas. For example, the phase difference co may be estimated through sampling the signals received by the two receive antennas Rx1 and Rx2, and then using a spectrum estimation method. A distance difference between distances of the two receive antennas respectively to the second Bluetooth device may be obtained through calculation based on the phase difference co and wavelengths. The distance difference is dcos θ in FIG. 16, where d is a distance between the two receive antennas, and θ is an included angle (that is, an arrival angle) between the second Bluetooth device and the receive antenna. Therefore, a value of θ may be obtained through calculation, that is, the arrival angle formed by the receive antenna and the second Bluetooth device.

Operation S1313: The second screen device determines, based on the received third control signal, a second arrival angle formed by a receive antenna of the second screen device and the second Bluetooth device, and a distance between the second screen device and the second Bluetooth device. The distance may be determined based on signal strength of the third control signal received by any antenna of the second screen device.

For related content of the second arrival angle formed by the receive antenna of the second screen device and the second Bluetooth device, refer to the description of the first arrival angle in operation S1312. Details are not described herein.

Operation S1314: The second screen device sends the second arrival angle to the first screen device.

Operation S1315: The first screen device determines, based on the first arrival angle, the second arrival angle, the distance between the first screen device and the second Bluetooth device, and the distance between the second screen device and the second Bluetooth device, a target screen device controlled by using the second Bluetooth device.

In an embodiment of operation S1315, the target screen device is determined based on an angle condition and/or a distance condition.

For example, the angle condition is that the first arrival angle is greater than the second arrival angle, and the distance condition is that the distance between the first screen device and the second Bluetooth device is less than the distance between the second screen device and the second Bluetooth device. If both the angle condition and the distance condition are met, it is determined that the target Bluetooth device is the first screen device. If the angle condition and the distance condition cannot be met at the same time, an optional manner is determining the target screen device based on the angle condition. To be specific, when the first arrival angle is greater than the second arrival angle, it is determined that the target Bluetooth device is the first screen device. Another optional manner is determining the target screen device based on the distance condition. To be specific, when the distance between the first screen device and the second Bluetooth device is less than the distance between the second screen device and the second Bluetooth device, it is determined that the target Bluetooth device is the first screen device.

For another example, the angle condition is that the second arrival angle is greater than the first arrival angle, and the distance condition is that the distance between the second screen device and the second Bluetooth device is less than the distance between the first screen device and the second Bluetooth device. If both the angle condition and distance condition are met, it is determined that the target Bluetooth device is the second screen device. If the angle condition and the distance condition cannot be met at the same time, an optional manner is determining the target screen device based on the angle condition. To be specific, when the second arrival angle is greater than the first arrival angle, it is determined that the target Bluetooth device is the second screen device. Another optional manner is determining the target screen device based on the distance condition. To be specific, when the distance between the second screen device and the second Bluetooth device is less than the distance between the first screen device and the second Bluetooth device, it is determined that the target Bluetooth device is the second screen device.

In the foregoing embodiment, description is provided by using an example in which the target screen device is determined based on the arrival angle and/or the distance. In some other embodiments, the target screen device may be determined based on a transmit angle instead of the arrival angle. For a specific determining manner, refer to related content of determining the target device based on the arrival angle and/or the distance. Details are not described herein again.

A subsequent process is described by using an example in which the target screen device is the second screen device.

Operation S1316: The first screen device sends a notification message to the second screen device. The notification message is used to indicate that the target screen device controlled by using the second Bluetooth device is the second screen device.

Operation S1317: The second screen device displays prompt information. The prompt information is used to indicate whether to bind the current Bluetooth device.

Figure 14:
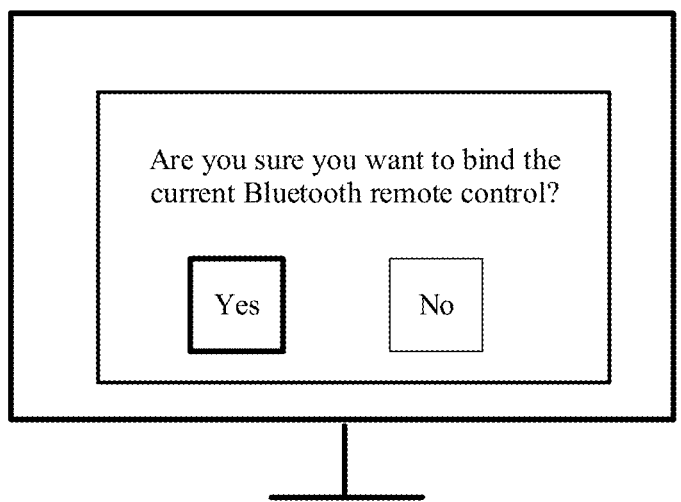
FIG. 14 is a schematic diagram of an interface according to an embodiment of this application.
Figure 14:

For the prompt information in operation S1317, refer to FIG. 14. As shown in FIG. 14, content of the prompt information may be "Are you sure you want to bind the current Bluetooth device?". This example does not limit the content of the prompt information.

Operation S1318: The second Bluetooth device detects a button operation of the user.

Operation S1319: The second Bluetooth device sends a fourth control signal to the second screen device. The fourth control signal is used to indicate to bind the second Bluetooth device.

Operation S1320: The second screen device is bound to the second Bluetooth device.

Operation S1321: The second screen device breaks the first Bluetooth connection to the first Bluetooth device.

Operation S1322: The second screen device breaks the third Bluetooth connection to the third Bluetooth device.

Correspondingly, after operation S1318, if the second screen device receives the fifth control signal, and the fifth control signal is used to indicate not to bind the second Bluetooth device, the second screen device does not perform any operation.

Further, the user may continue to operate the first Bluetooth device and the third Bluetooth device, to control the removed first Bluetooth device. For details, refer to the related content of removing the primary control device in the screen group. Details are not described herein again.

In the foregoing example, when at least two screen devices are split from the screen group system, a screen that the user expects to control is identified based on the distance and the angle of the control signal of the Bluetooth remote control operated by the user, to implement a connection between the Bluetooth device held by the user and the screen device removed from the screen group.

Figure 15A:
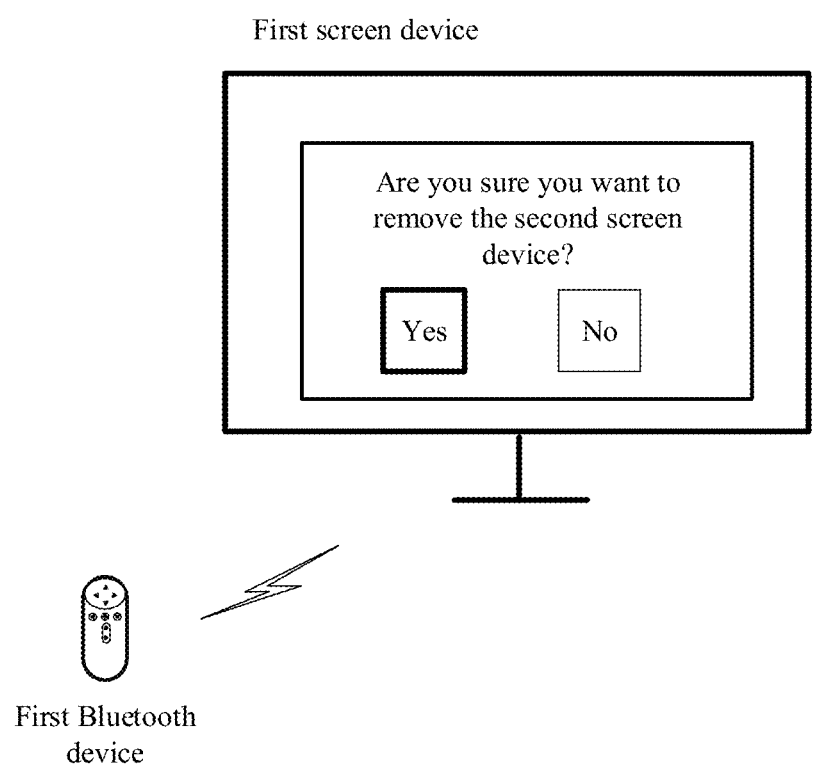
FIG. 15A is a schematic diagram of an interface according to an embodiment of this application.
Figure 15B:
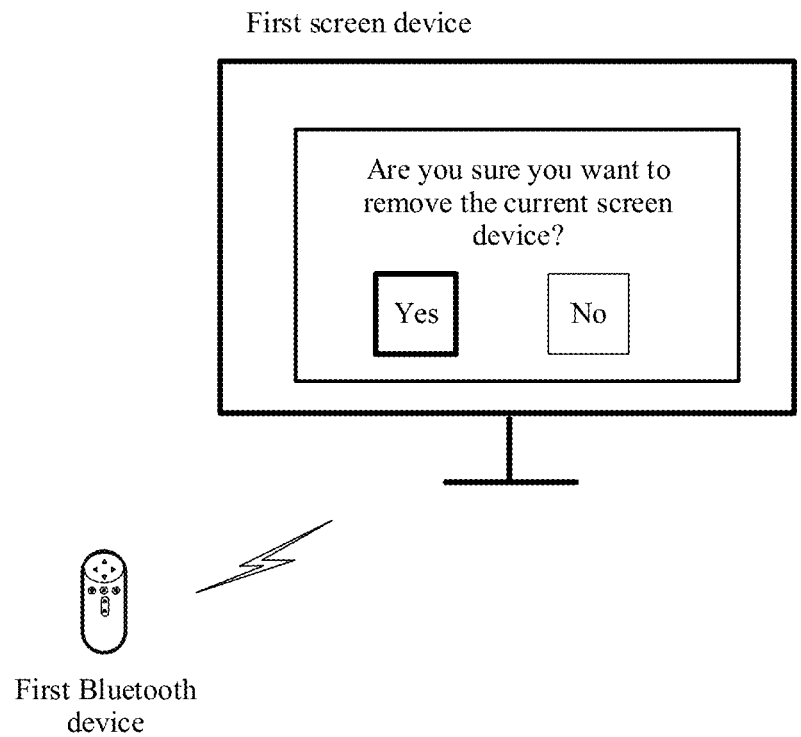
FIG. 15B is a schematic diagram of an interface according to an embodiment of this application.

In some other embodiments, in a scenario of removing one screen device, after the first screen device detects a screen removal operation, for example, the screen removal operation is used to remove an auxiliary screen, for example, the second screen device, the following process may further be included: The first screen device prompts the user whether to remove the second screen device. As shown in FIG. 15A, the prompt information may be "Are you sure you want to remove the second screen device?". Alternatively, the first screen device sends instruction information to the second screen device, to instruct the second screen device to display prompt information, for example, "Are you sure you want to remove the current screen device?" If the user chooses to agree to remove the second screen device, for example, the second Bluetooth device receives a button operation, the second Bluetooth device sends, to the first screen device, a control signal used to indicate that the user agrees to remove the second Bluetooth device. Then the first screen device sends instruction information to the second screen device, to instruct the second screen device to establish a connection to the second Bluetooth device. If the user chooses not to agree to remove the second screen device, subsequent operations are not performed. In some other embodiments, if the primary control device, that is, the first screen device, needs to be removed, after detecting the removal operation for the first screen device, the first screen device may display prompt information "Are you sure you want to remove the current screen device?" shown in FIG. 15B.

In this embodiment of this application, when the screen device is to be removed from the screen group, there may be a plurality of pairing manners between the screen device and the Bluetooth device. A possible manner is shown in FIG. 13D-1 and FIG. 13D-2. The target screen device that the user expects to control is determined through determining an angle at which each screen device in the screen group receives a control signal of a Bluetooth device and a distance between each screen device and the Bluetooth device. In some other embodiments, prompt information output by each screen device in the screen group may be used, for example, in a manner of displaying the prompt information, or in a manner of playing a voice, to guide the user to complete binding between the screen device and the Bluetooth device through a specific remote control operation.

Figure 17:
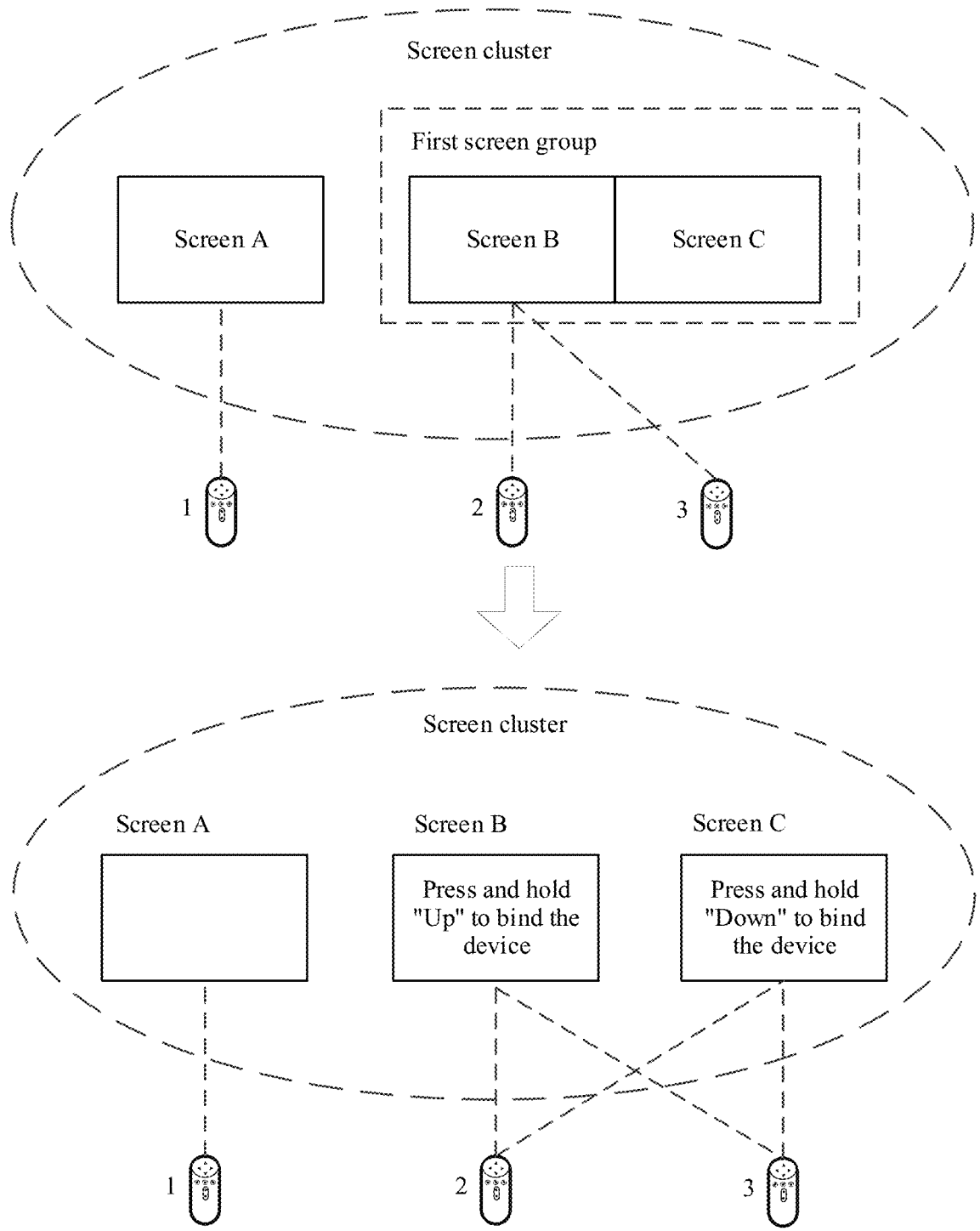
FIG. 17 is a schematic diagram of another example scenario to which a method for controlling a plurality of screen devices is applicable according to an embodiment of this application.

FIG. 17 is a schematic diagram of another example scenario to which a method for controlling a plurality of screen devices is applicable according to an embodiment of this application.

As shown in FIG. 17, for a screen A, a screen B, and a screen C in a same screen cluster, the screen A is an independent screen, and the screen B and the screen C are spliced to form a first screen group. The screen B is a primary control device. The screen B establishes Bluetooth connections respectively to a Bluetooth remote control 2 and a Bluetooth remote control 3. When the screen C is split from the first screen group, the screen B and the screen C are connected to the Bluetooth remote control 2 and the Bluetooth remote control 3 at the same time through the processes from operations S1301 to S1308 shown in FIG. 13D-1. The screen B prompts to press and hold "Up" to bind the device. The screen C prompts to press and hold "Down" to bind the device. A screen group system determines, based on input of a Bluetooth remote control currently operated by a user, the screen that the user expects to bind. For example, the user currently uses the Bluetooth remote control 3, and an operation of pressing and holding a button "Up". Both the screen B and the screen C may receive the operation of pressing and holding the button "Up". Then, the screen B determines that the operation of pressing and holding the button "Up" matches prompt information of the screen B, and completes binding to the Bluetooth remote control 3 after receiving the operation. However, the screen C determines that the operation of pressing and holding the button "Up" does not match the prompt information of the screen C, and the screen C is not bound to the Bluetooth remote control 3. For another example, the user currently uses the Bluetooth remote control 3, and an operation of pressing and holding a button "Down". Both the screen B and the screen C may receive the operation of pressing and holding the button "Down". Then, the screen C determines that the operation of pressing and holding the button "Down" matches prompt information of the screen C, and completes binding to the Bluetooth remote control 3 after receiving the operation. However, the screen B determines that the operation of pressing and holding the button "Down" does not match the prompt information of the screen B, and the screen B is not bound to the Bluetooth remote control 3.

With reference to a specific example, the following describes a screen control process in a scenario in which a screen group is split into independent screen devices.

Figure 18:
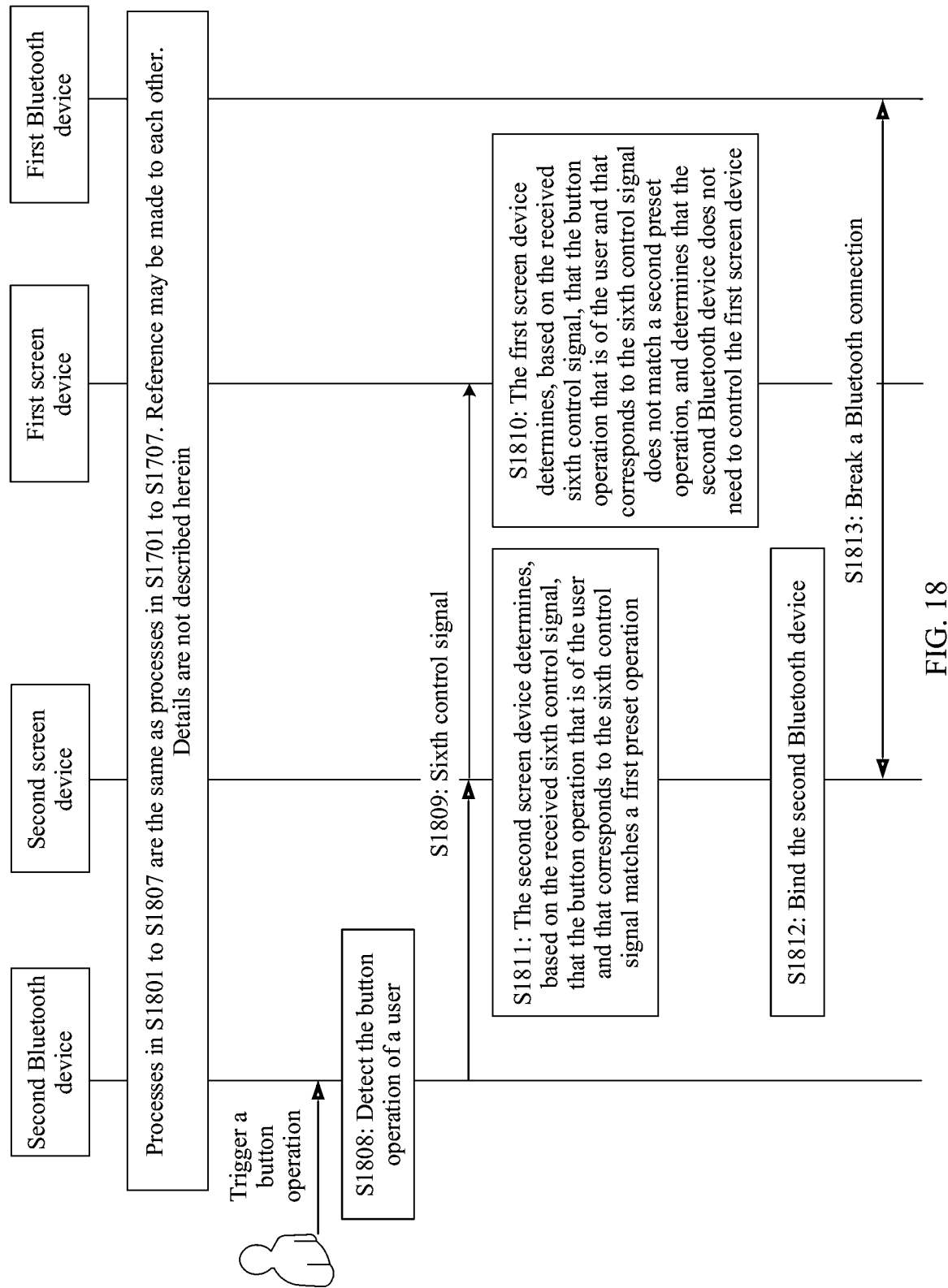
FIG. 18 is a seventh flowchart of a method for controlling a plurality of screen devices according to an embodiment of this application.

Based on the foregoing content, FIG. 18 is a seventh flowchart of a method for controlling a plurality of screen devices according to an embodiment of this application. The example shown in FIG. 18 may be applied in the scenario shown in FIG. 17. In the example shown in FIG. 18, a first screen device may be the screen B, a second screen device may be the screen C, and a third screen device may be the screen A. Specifically, a specific procedure of this example may include the following operations.

Processes in operations S1801 to S1807 are the same as the processes in operations S1501 to S1507. Details are not described herein again.

Operation S1808: The second Bluetooth device detects a button operation of a user.

Operation S1809: The second Bluetooth device separately sends a sixth control signal to the first screen device and the second screen device in response to the button operation of the user.

Operation S1810: The first screen device determines, based on the received sixth control signal, that the button operation that is of the user and that corresponds to the sixth control signal does not match a second preset operation, and determines that the second Bluetooth device does not need to control the first screen device.

Operation S1811: The second screen device determines, based on the received sixth control signal, that the button operation that is of the user and that corresponds to the sixth control signal matches a first preset operation.

Operation S1812: The second screen device is bound to the second Bluetooth device.

Operation S1813: The second screen device breaks a Bluetooth connection to the first Bluetooth device.

In some other embodiments, after operation S1808, if the second screen device determines, based on a received seventh control signal, that a button operation that is of the user and that corresponds to the seventh control signal does not match a preset operation, the second screen device is not bound to the second Bluetooth device.

In some other embodiments, if a primary control device, that is, the first screen device, needs to be removed, a removal process is as follows:

After detecting a removal operation for the first screen device, the first screen device skips processes similar to operations S1802 to S1807, directly performs operations similar to operations S1808 and S1809, and then performs the following operation: The first screen device determines, based on the received sixth control signal, that the button operation that is of the user and that corresponds to the sixth control signal matches a second preset operation. Then, the first screen device is bound to the second Bluetooth device, and breaks a Bluetooth connection to the first Bluetooth device. Another screen device in the screen group re-determines a primary control device. For a subsequent process, refer to operations S702 to S711 in FIG. 7. Details are not described herein again.

The following describes a Bluetooth device provided in embodiments of this application.

Figure 19:
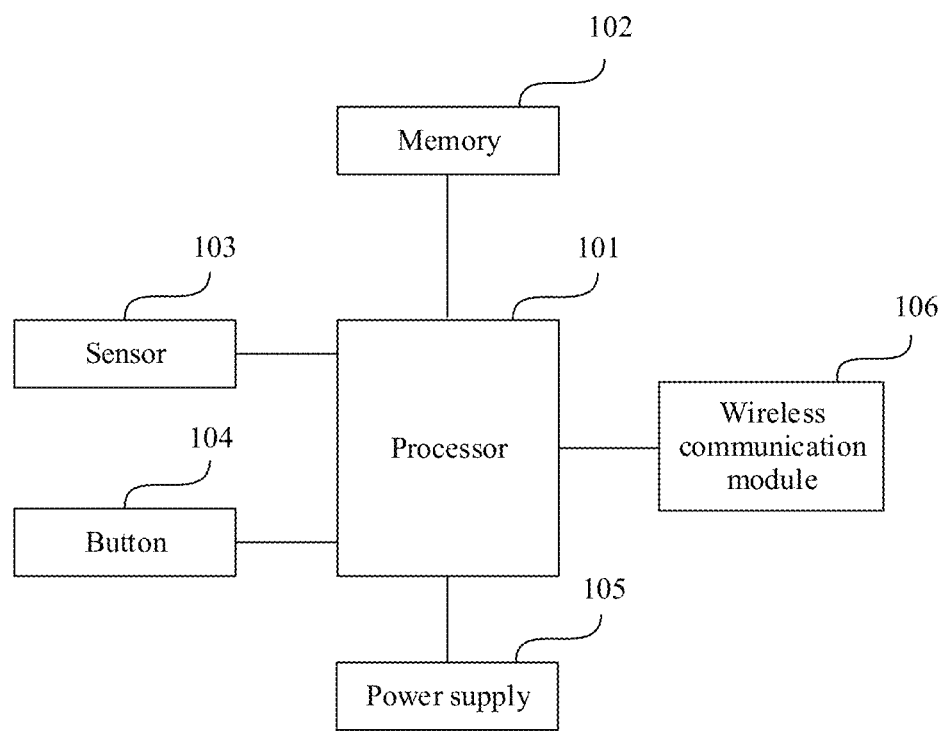
FIG. 19 is a schematic diagram of a structure of a Bluetooth device according to an embodiment of this application.

FIG. 19 is a schematic diagram of an example structure of a Bluetooth device according to an embodiment of this application. The Bluetooth device may include a processor 101, a memory 102, a sensor 103, a button 104, a power supply 105, a wireless communication module 106, and the like. It may be understood that the structure illustrated in this embodiment of the present invention does not constitute specific limitation on the Bluetooth device. In other embodiments of the present invention, the Bluetooth device may include more or fewer components than those shown in the figure, or combine some components, or split some components, or have a different component arrangement. The components shown in the figure may be implemented by hardware, software, or a combination of software and hardware.

The processor 101 may include one or more processing units. For example, the processor 101 may include an application processor AP, a modem processor, a controller, a memory, a digital signal processor (DSP), a baseband processor, and the like. Different processing units may be independent components, or may be integrated into one or more processors. The controller may be a nerve center and a command center of the Bluetooth device. The controller may generate an operation control signal based on an instruction operation code and a time sequence signal, to complete control of instruction fetch and instruction execution.

A memory may be further disposed in the processor 101, and is configured to store instructions and data. In some embodiments, the memory in the processor 101 is a cache. The memory may store an instruction or data that is just used or cyclically used by the processor 101. If the processor 101 needs to use the instruction or the data again, the processor may directly invoke the instruction or the data from the memory.

In some embodiments, the processor 101 may include one or more interfaces. The interface may include an integrated circuit (I2C) interface, a pulse code modulation (PCM) interface, a universal asynchronous receiver/transmitter (UART) interface, a general-purpose input/output (GPIO) interface, a universal serial bus (USB) interface, and/or the like.

The processor 101 may control execution of application program code, to implement functions of the Bluetooth device in this embodiment. For example, after receiving, by using the wireless communication module 106, a Bluetooth broadcast sent by a large-screen electronic device 200, the Bluetooth device establishes a Bluetooth connection to the large-screen electronic device 200 in response to the Bluetooth broadcast.

The memory 102 may be configured to store computer-executable program code. The executable program code includes instructions. The processor 101 runs the instructions stored in the memory 102, to perform various function applications and data processing of the Bluetooth device. The memory 102 may include a program storage region. The program storage region may store an operating system, an application required by at least one function (for example, a button control function), and the like. The memory 102 may further include a data storage region. The data storage area may store identification information of the large-screen electronic device 200 that has been successfully paired with the Bluetooth device, for example, a name and a Bluetooth address of the large-screen electronic device 200. In this case, after the large-screen electronic device 200 is powered on, the Bluetooth device may be automatically paired with the large-screen electronic device 200 based on the identification information.

The sensor 103 may be an optical proximity sensor. The processor 101 of the Bluetooth device may determine, by using the sensor 103, whether there is an object near the Bluetooth device, to determine whether the Bluetooth device is close to the Bluetooth device. Alternatively, the sensor 103 may be a distance sensor, and the processor 101 of the Bluetooth device may determine a distance between Bluetooth devices by using the sensor 103. In some embodiments, the sensor 103 may be alternatively a touch sensor or a pressure sensor, and is separately configured to detect a touch operation and a press operation of the user on the Bluetooth device. In some other embodiments, the sensor 103 may be alternatively a fingerprint sensor; and is configured to: detect a fingerprint of the user, and recognize an identify the user, and the like.

The button 104 includes a power button, a volume button, a direction selection button, and the like. The button 104 may be a mechanical button, or may be a touch key. The Bluetooth device may receive button input, and generate a key signal input related to function control of the Bluetooth device.

The power supply 105 may be configured to supply power to each component included in the Bluetooth device. In some embodiments, the power supply 106 may be a battery, for example, a rechargeable battery.

The wireless communication module 106 is configured to establish a wireless connection to another large-screen electronic device (for example, the large-screen electronic device 200, or another Bluetooth device), so that the Bluetooth device can perform data interaction with the another large-screen electronic device. In some embodiments, the wireless communication module 106 may be an NFC module, so that the Bluetooth device can perform near-field communication with another large-screen electronic device (for example, a Bluetooth headset) including an NFC module. The another large-screen electronic device including the NFC module may store related information of the large-screen electronic device, for example, a name and address information of the large-screen electronic device. In this way, the NFC module of the Bluetooth device may read the related information from the NFC module of the large-screen electronic device, to send the related information to the large-screen electronic device 200. In some other embodiments, the wireless communication module 106 may also be a Bluetooth module. The Bluetooth module stores a Bluetooth address of the Bluetooth device, so that the large-screen electronic device 200 can establish a Bluetooth connection to the Bluetooth device based on the Bluetooth address and transmit data and the like through the Bluetooth connection. In this embodiment of this application, the Bluetooth module may support all of a plurality of types of Bluetooth connections, for example, SPP, BLE, or GATT. This is not limited herein.

In some other embodiments, the wireless communication module 106 may be alternatively an infrared module, a Wi-Fi module, or the like. A specific implementation of the wireless communication module 106 is not limited herein.

In addition, in this embodiment of this application, one or more wireless communication modules 106 may be disposed according to a requirement. For example, two wireless communication modules may be disposed in the Bluetooth device, where one wireless communication module is a Bluetooth module, and the other wireless communication module is a Wi-Fi module. In this way, the Bluetooth device may separately perform data communication by using the two wireless communication modules. A quantity of wireless communication modules 106 is not limited herein.

It may be understood that the structure illustrated in this embodiment does not constitute specific limitation on the Bluetooth device. The electronic device may have more or fewer components than those shown in FIG. 16, may combine two or more components, or may have different component configurations. For example, the Bluetooth device further includes a component such as an indicator light (which may indicate a status such as a battery level or key input status). Various components shown in FIG. 16 may be implemented in hardware, software, or a combination of hardware and software including one or more signal processing and/or application-specific integrated circuits.

The following describes a screen device provided in embodiments of this application.

Figure 20:
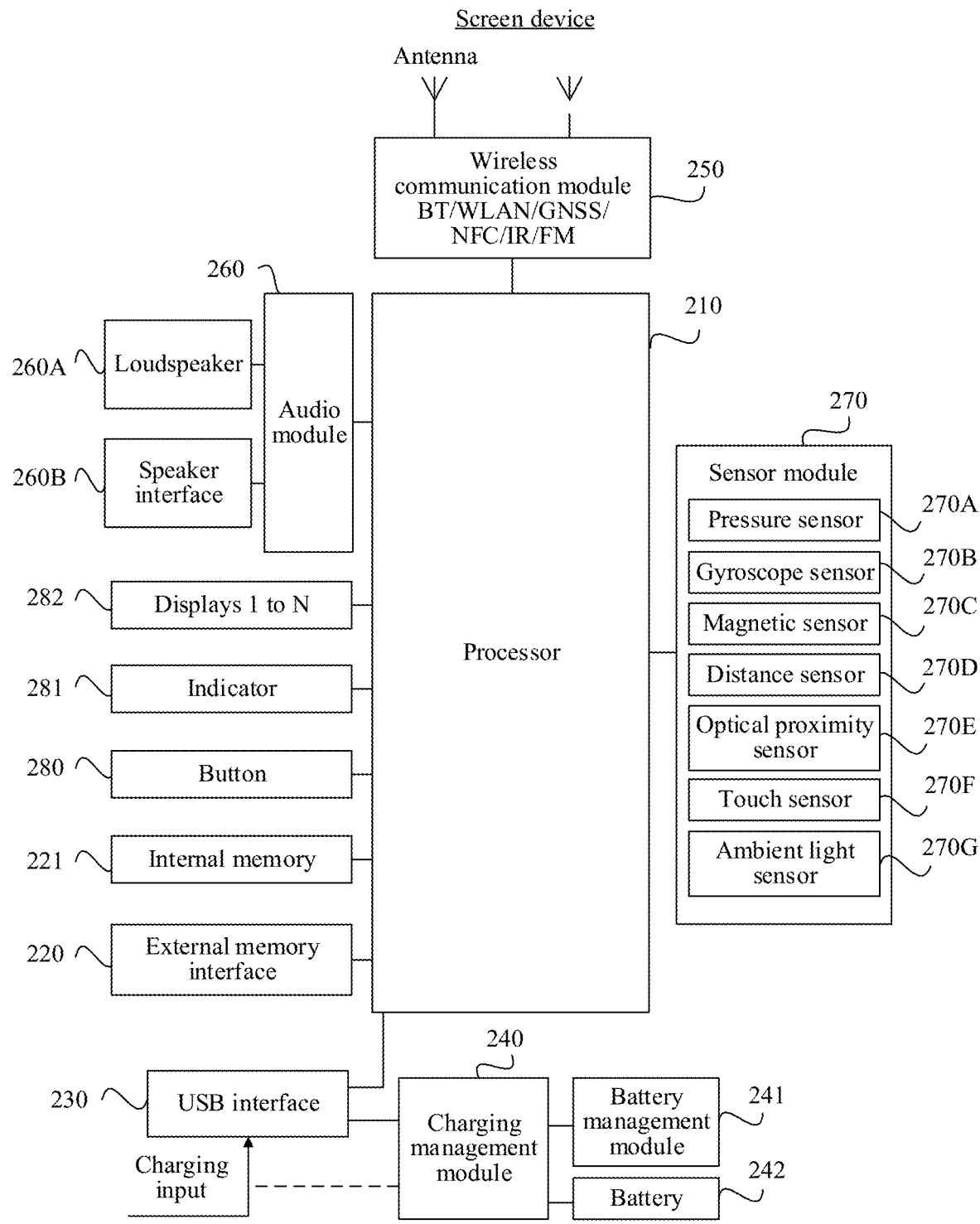
FIG. 20 is a schematic diagram of a structure of an electronic device according to an embodiment of this application.

FIG. 20 is a schematic diagram of an example structure of a screen device according to an embodiment of this application. The screen device may include a processor 210, an external memory interface 220, an internal memory 221, a universal serial bus (USB) interface 230, a charging management module 240, a power management module 241, a battery 242, an antenna, a wireless communication module 250, an audio module 260, a loudspeaker 260A, a speaker interface 260B, a sensor module 270, a button 280, an indicator 281, a display 282, and the like. The sensor module 270 may include a pressure sensor 270A, a gyroscope sensor 270B, a magnetic sensor 270C, a distance sensor 270D, an optical proximity sensor 270E, a touch sensor 270F, an ambient light sensor 270G, and the like.

It may be understood that the structure illustrated in this embodiment of the present invention does not constitute specific limitation on the screen device. In other embodiments of the present invention, the screen device may include more or fewer components than those shown in the figure, or combine some components, or split some components, or have a different component arrangement. The components shown in the figure may be implemented by hardware, software, or a combination of software and hardware.

The processor 210 may include one or more processing units. For example, the processor 210 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may be a nerve center and a command center of the screen device. The controller may generate an operation control signal based on an instruction operation code and a time sequence signal, to complete control of instruction fetch and instruction execution.

A memory may be further disposed in the processor 210, and is configured to store instructions and data. In some embodiments, the memory in the processor 210 is a cache. The memory may store an instruction or data that is just used or cyclically used by the processor 210. If the processor 210 needs to use the instruction or the data again, the processor may directly invoke the instruction or the data from the memory. This avoids repeated access, reduces a waiting time of the processor 210, and improves system efficiency.

In some embodiments, the processor 210 may include one or more interfaces. The interface may include an integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The processor 210 may control execution of application program code, to implement functions of the screen device in this embodiment. For example, after receiving, by using the wireless communication module 250, a Bluetooth broadcast sent by a Bluetooth device 100, the screen device controls, in response to the Bluetooth broadcast, the screen device to initiate a Bluetooth connection to the Bluetooth device 100, to implement effect that the screen device and the Bluetooth device 100 perform data transmission through the Bluetooth connection.

The USB interface 230 is an interface conforming to a USB standard specification; and may be specifically a mini USB interface, a micro USB interface, a USB type C interface, or the like. The USB interface 230 may be used for connecting a charger to charge the screen device, or may be used for data transmission between the screen device and a peripheral device, or may be used for connecting to a speaker, to play audio by using the speaker. The interface may be alternatively configured to connect to another screen device such as an AR device.

It can be understood that an interface connection relationship, between the modules, illustrated in this embodiment of the present invention is merely an example for description, and does not constitute a limitation on a structure of the screen device. In some other embodiments of the present invention, the screen device may alternatively use an interface connection manner different from that in the foregoing embodiment, or a combination of a plurality of interface connection manners.

The charging management module 240 is configured to receive a charging input from a charger. The charger may be a wireless charger or a wired charger. In some embodiments of wired charging, the charging management module 240 may receive a charging input of a wired charger through the USB interface 230. In some embodiments of wireless charging, the charging management module 240 may receive a wireless charging input through a wireless charging coil of the screen device. The charging management module 240 supplies power to the screen device through the power management module 241 while charging the battery 242.

The power management module 241 is configured to connect the battery 242 and the charging management module 240 to the processor 210. The power management module 241 receives input of the battery 242 and/or the charging management module 240, and supplies power to the processor 210, the internal memory 221, the external memory, the display 282, the wireless communication module 250, and the like. The power management module 241 may be further configured to monitor parameters such as a battery capacity, a battery cycle count, and a battery health status (electric leakage or impedance). In some other embodiments, the power management module 241 may be alternatively disposed in the processor 210. In some other embodiments, the power management module 241 and the charging management module 240 may be alternatively disposed in a same device.

A wireless communication function of the screen device may be implemented by using the antenna, the wireless communication module 250, the modem processor, the baseband processor, and the like.

The antenna is configured to transmit and receive an electromagnetic wave signal. Each antenna of the screen device may be configured to cover one or more communication frequency bands. Different antennas may be further multiplexed, to improve antenna utilization. For example, one of the plurality of antennas may be multiplexed as a diversity antenna of a wireless local area network. In some other embodiments, the antenna may be used in combination with a tuning switch.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using the audio module 260 (which is not limited to the loudspeaker 260A, the speaker interface 260B, or the like), or displays an image or a video by using the display 282. In some embodiments, the modem processor may be an independent component. In some other embodiments, the modem processor may be independent of the processor 210, and is disposed in the same device as the wireless communication module 250 or another functional module.

The wireless communication module 250 may provide wireless communication solutions that are applied to the screen device and that include Bluetooth (BT), a wireless local area network (WLAN) (such as a wireless fidelity (Wi-Fi) network), a global navigation satellite system (GNSS), frequency modulation (FM), a near field wireless communication (NFC) technology, an infrared technology (IR), and the like. The wireless communication module 250 may be one or more components integrating at least one communication processing module. The wireless communication module 250 receives an electromagnetic wave through the antenna, performs frequency modulation and filtering processing on the electromagnetic wave signal, and sends a processed signal to the processor 210. The wireless communication module 250 may further receive a to-be-sent signal from the processor 210, perform frequency modulation and amplification on the signal, and convert the signal into an electromagnetic wave for radiation through the antenna.

The screen device implements a display function by using the GPU, the display 282, the application processor, and the like. The GPU is a microprocessor for image processing, and is connected to the display 282 and the application processor. The GPU is configured to: perform mathematical and geometric computation, and render an image. The processor 210 may include one or more GPUs that execute program instructions to generate or change display information.

The display 282 is configured to display an image, a video, and the like. For example, after the screen device receives a Bluetooth broadcast of the Bluetooth device 100, the display 282 displays pairing information of the Bluetooth device 100, and prompts the user whether a Bluetooth connection needs to be established to the Bluetooth device 100. If the screen device receives an operation performed by the user to instruct to establish the Bluetooth connection to the Bluetooth device 100, the screen device displays, on the display 282 in response to the operation, an interface for establishing the Bluetooth connection to the Bluetooth device 100.

The display 282 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the screen device may include one or more displays 282, for example, may include 2, 4, or N displays 282, where N is a positive integer greater than 4.

The external memory interface 220 may be configured to connect to an external storage card, for example, a micro SD card, to extend a storage capability of the screen device. The external memory card communicates with the processor 210 through the external memory interface 220, to implement a data storage function. For example, files such as music and videos are stored in the external storage card.

The internal memory 221 may be configured to store computer-executable program code. The executable program code includes instructions. The processor 210 runs the instructions stored in the internal memory 221, to perform various function applications and data processing of the screen device. The internal memory 221 may include a program storage area and a data storage area. The program storage region may store an operating system, an application required by at least one function (for example, a sound play function and an image play function), and the like. The data storage region may store data (such as audio data and an address book) created during use of the screen device, and the like. In addition, the internal memory 221 may include a high-speed random access memory, and may further include a non-volatile memory, such as at least one disk storage component, a flash memory device, or a universal flash storage (UFS).

The screen device may implement an audio function by using the audio module 260, the loudspeaker 260A, the speaker interface 260B, and the application processor.

The audio module 260 is configured to convert digital audio information into an analog audio signal for output, and is also configured to convert an analog audio input into a digital audio signal. The audio module 260 may be further configured to code and decode an audio signal. In some embodiments, the audio module 260 may be disposed in the processor 210, or some functional modules in the audio module 260 are disposed in the processor 210.

The loudspeaker 260A, also referred to as a "speaker", is configured to convert an audio electrical signal into a sound signal. The screen device may be used to listen to music or audio by using the loudspeaker 260A. For example, after the screen device establishes the Bluetooth connection to the Bluetooth device 100, the loudspeaker 260A may play a voice prompt.

The button 280 includes a power button, a volume button, and the like. The button 280 may be a mechanical button, or may be a touch key. The screen device may receive button input, and generate key signal input related to user settings and function control of the screen device.

The indicator 281 may be an indicator light; and may be configured to indicate a charging status and a battery level change, or may be configured to indicate a message, a connection status with the Bluetooth device 100, a notification, and the like.

In the foregoing embodiments provided in this application, the method provided in embodiments of this application is described from a perspective in which a screen device (or a Bluetooth device) serves as an execution entity. To implement functions in the method provided in the foregoing embodiments of this application, the screen device (or the Bluetooth device) may include a hardware structure and/or a software module, and implement the foregoing functions in a form of the hardware structure, the software module, or a combination of the hardware structure and the software module. Whether a function in the foregoing functions is executed in a form of the hardware structure, the software module, or both the hardware structure and the software module depends on specific application and design constraint conditions of the technical solutions.

According to the context, the term "when" or "after" used in the foregoing embodiments may be interpreted as a meaning of "if", "following", "in response to determining", or "in response to detecting". Similarly, according to the context, the phrase "when it is determined that" or "if (a stated condition or event) is detected" may be interpreted as a meaning of "when it is determined that", "in response to determining", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean reference to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

All or some of the foregoing embodiments may be implemented by using software, hardware, firmware, or any combination thereof. When software is used to implement the operations, all or some of the operations may be implemented in a form of a computer program product. The computer program product includes one or more computer instructions. When the computer program instructions are loaded and executed on a computer, all or some procedures or functions in embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid state disk (SSD)), or the like. When no conflict occurs, the solutions in the foregoing embodiments may be combined for use.

It should be noted that a part of the application document of this patent includes copyright-protected content. A copyright owner reserves the copyright except copies made for the patent document or the recorded content of the patent document in the China National Intellectual Property Administration.

What is claimed is:

1. A method for controlling a plurality of screen devices in a communication system, the method comprising:
   forming, by a first screen device of the plurality of screen devices and a second screen device of the plurality of screen devices, a first screen group;
   assigning the first screen device to be a primary control device of the first screen group, wherein the first screen device is paired with a first Bluetooth device through a first Bluetooth connection, and the second screen device is paired with a second Bluetooth device through a second Bluetooth connection, the second Bluetooth device being different from the first Bluetooth device; and
   sending, by the first screen device, first instruction information to the second screen device to instruct the second Bluetooth device to be communicatively connected to the first screen device.

2. The method according to claim 1, wherein the first instruction information is further used to instruct the second screen device to share a received control signal with the first screen device.

3. The method according to claim 1, further comprising:
   after the sending, by the first screen device, first instruction information to the second screen device, establishing, by the first screen device, a third Bluetooth connection to the second Bluetooth device, wherein the first instruction information is used to instruct the second Bluetooth device to establish the third Bluetooth connection to the first screen device.

4. The method according to claim 3, wherein the first instruction information is further used to instruct the second screen device to disconnect the second Bluetooth connection from the second Bluetooth device; and
   after the sending, by the first screen device, first instruction information to the second screen device, the method further comprises:
   releasing, by the second screen device, the second Bluetooth connection to the second Bluetooth device based on the first instruction information.

5. The method according to claim 3, comprising:
   after the establishing, by the first screen device, the third Bluetooth connection to the second Bluetooth device, receiving, by the first screen device, a first control signal sent by a target Bluetooth device, wherein the target Bluetooth device is the first Bluetooth device or the second Bluetooth device, and the first control signal is used to operate to-be-displayed content of the first screen group;

dividing, by the first screen device, the to-be-displayed content into a first part and a second part based on the first control signal;

sending, by the first screen device, a first control instruction to the second screen device, wherein the first control instruction is used to instruct the second screen device to display the second part of the to-be-displayed content;

displaying, by the first screen device, the first part; and displaying, by the second screen device, the second part.

6. The method according to claim 1, wherein the forming, by the first screen device and the second screen device, a first screen group comprises:

detecting, by the first screen device, a first screen combination operation; and forming, by the first screen device, the first screen group with the second screen device in response to the first screen combination operation.

7. The method according to claim 6, wherein the first screen combination operation is an operation that is triggered by a user to physically splice the first screen device and the second screen device into a combined screen.

8. The method according to claim 6, comprising:

before the forming, by the first screen device, the first screen group with the second screen device in response to the first screen combination operation, displaying, by the first screen device, first prompt information, wherein the first prompt information indicates whether the first screen device forms a screen group with the second screen device; and sending, by the first Bluetooth device, a first control signal to the first screen device, wherein the first control signal is used to indicate the first screen device to form the screen group with the second screen device.

9. The method according to claim 6, comprising:

before the forming, by the first screen device and the second screen device, a first screen group, discovering, by the first screen device and the second screen device, each other, establishing a network connection, and forming a screen cluster, wherein a screen device in the screen cluster shares device information and pairing information of the screen device and a Bluetooth device paired with the screen device.

10. The method according to claim 1, wherein assigning the first screen device to be the primary control device of the first screen group comprises:

determining, by the first screen device and the second screen device through negotiation, that the first screen device is a screen device with an optimal resource, and determining that the first screen device is a primary control device of the first screen group, wherein the screen device with the optimal resource is determined based on performance of the screen device and a primary control identifier.

11. A communication system for controlling a plurality of screen devices, the communication system comprising:

a first screen device of the plurality of screen devices, the first screen device paired with a first Bluetooth device via a first Bluetooth connection; and a second screen device of the plurality of screen devices, the second screen device paired with a second Bluetooth device via a second Bluetooth connection, the second Bluetooth device being different from the first Bluetooth device, wherein the first screen device is configured to: form a first screen group with the second screen device, operate as a primary control device of the first screen group, and send first instruction information to the second screen device to instruct the second Bluetooth device to be communicatively connected to the first screen device.

12. The communication system according to claim 11, wherein the first instruction information is further used to instruct the second screen device to share a received control signal with the first screen device.

13. The communication system according to claim 12, wherein the first screen device is further configured to:

detect a first screen combination operation; and form the first screen group with the second screen device in response to the first screen combination operation.

14. The communication system according to claim 13, wherein the first screen combination operation is an operation that is triggered by a user to physically splice the first screen device and the second screen device into a combined screen.

15. The communication system according to claim 13, wherein before the first screen device forms the first screen group with the second screen device in response to the first screen combination operation, the first screen device is further configured to display first prompt information, wherein the first prompt information indicates whether the first screen device forms a screen group with the second screen device; and the first Bluetooth device is configured to send a first control signal to the first screen device, wherein the first control signal is used to indicate the first screen device to form the screen group with the second screen device.

16. The communication system according to claim 13, wherein before the first screen device forms the first screen group with the second screen device, the first screen device is further configured to: discover each other with the second screen device, establish a network connection, and form a screen cluster, wherein a screen device in the screen cluster shares device information and pairing information of the screen device and a Bluetooth device paired with the screen device.

17. The communication system according to claim 11, wherein the first instruction information is used to instruct the second Bluetooth device to establish a Bluetooth connection to the first screen device, and the first screen device is further configured to:

establish a third Bluetooth connection to the second Bluetooth device.

18. The communication system according to claim 17, wherein the first instruction information is further used to instruct the second screen device to break disconnect the second Bluetooth connection from the second Bluetooth device; and the second screen device is configured to:

release, by the second screen device, the second Bluetooth connection to the second Bluetooth device based on the first instruction information.

19. The communication system according to claim 17, wherein after the first screen device establishes the second Bluetooth connection to the second Bluetooth device, the first screen device is further configured to: receive a first control signal sent by a target Bluetooth device, wherein the target Bluetooth device is the first Bluetooth device or the second Bluetooth device, and the first control signal is used to operate to-be-displayed content of the first screen group;

divide the to-be-displayed content into a first part and a second part based on the first control signal;

send a first control instruction to the second screen device, wherein the first control instruction is used to instruct the second screen device to display the second part of the to-be-displayed content; and display the first part; and the second screen device is further configured to display the second part.

20. The communication system according to claim 11, wherein the first screen device is further configured to:

determine, through negotiation with the second screen device, that the first screen device is a screen device with an optimal resource, and determine that the first screen device is a primary control device of the first screen group, wherein the screen device with the optimal resource is determined based on performance of the screen device and a primary control identifier.

* * * * *